US012675828B2

(12) United States Patent
Border

(10) Patent No.: US 12,675,828 B2
(45) Date of Patent: Jul. 7, 2026

(54) RIDE FOR HIRE

(71) Applicant: Allstate Insurance Company,
Northbrook, IL (US)

(72) Inventor: David R. Border, Palatine, IL (US)

(73) Assignee: Allstate Insurance Company,
Northbrook, IL (US)

( * ) Notice: Subject to any disclaimer, the term of this
patent is extended or adjusted under 35
U.S.C. 154(b) by 0 days.

(21) Appl. No.: 18/781,370

(22) Filed: Jul. 23, 2024

(65) Prior Publication Data

US 2024/0378680 A1 Nov. 14, 2024

Related U.S. Application Data

(63) Continuation-in-part of application No. 15/052,698,
filed on Feb. 24, 2016, now abandoned.

(51) Int. Cl.
G06Q 50/47 (2024.01)
G06Q 40/08 (2012.01)

(52) U.S. Cl.
CPC ....... G06Q 40/08221 (2025.08); G06Q 50/47
(2024.01); *G06Q 40/08* (2013.01); *G06Q*
*40/0842* (2025.08)

(58) Field of Classification Search
USPC .......................................................... 705/4
See application file for complete search history.

(56) References Cited

U.S. PATENT DOCUMENTS 8,126,903 B2    2/2012  Lehmann
8,260,639 B1 *  9/2012  Medina, III  ........... G06Q 40/08
705/4

8,401,878 B2 *  3/2013  Stender  .................. G06Q 40/08
705/40
9,157,748 B2   10/2015  Millspaugh
9,505,494 B1 *  11/2016  Marlow  .............. G05D 1/0011
10,387,962 B1 *  8/2019  Potter  .................... G08B 25/00
(Continued)

FOREIGN PATENT DOCUMENTS

WO      WO-2013072867 A1 *  5/2013  ............. G06Q 40/08

OTHER PUBLICATIONS

Title: National Association of Insurance Commissioners (NAIC)
Date: Mar. 31, 2015 pp. 31 (Year: 2015).*

(Continued)

*Primary Examiner* — Bennett M Sigmond
*Assistant Examiner* — Yongsik Park

(57) ABSTRACT

Systems, apparatuses, methods discussed herein provide
insurance for individuals who provide a ride hailing appli-
cation to a mobile device configured to receive telematics
data indicating an accident of the vehicle associated with the
mobile device and to send metadata comprising an indica-
tion of interaction with the ride hailing application by the
driver during the time of the accident as indicated by the
telematics data. Based on the metadata, a period of use of the
plurality of periods of use of the ride hailing application
during which the accident occurred may be determined and
a notification to the mobile device based on the determina-
tion that the driver was interacting with the ride hailing
application may be sent to the mobile device. Further, one or
more operational states of the ride hailing application or a
device or system may be updated or altered based on the
transmitted notification.

20 Claims, 11 Drawing Sheets

(56)                References Cited

U.S. PATENT DOCUMENTS

| | | | | |
|---|---|---|---|---|
| 10,733,672 | B1 * | 8/2020 | Bernstein | G07C 5/0841 |
| 2010/0280852 | A1 * | 11/2010 | Huang | G06Q 40/08 |
| | | | | 705/400 |
| 2013/0204645 | A1 * | 8/2013 | Lehman | G06Q 40/08 |
| | | | | 705/4 |
| 2014/0172727 | A1 * | 6/2014 | Abhyanker | G06Q 50/40 |
| | | | | 705/307 |
| 2014/0300739 | A1 * | 10/2014 | Mimar | G06Q 30/0283 |
| | | | | 348/148 |
| 2015/0145695 | A1 * | 5/2015 | Hyde | G08G 1/166 |
| | | | | 340/905 |
| 2015/0154712 | A1 * | 6/2015 | Cook | G06Q 40/08 |
| | | | | 705/4 |
| 2015/0325128 | A1 * | 11/2015 | Lord | G06Q 10/047 |
| | | | | 705/13 |
| 2016/0182707 | A1 * | 6/2016 | Gabel | G06F 3/04883 |
| | | | | 455/404.2 |
| 2016/0364823 | A1 * | 12/2016 | Cao | G06Q 50/40 |

OTHER PUBLICATIONS

Title: Ride-Hailing Insurance for Uber and Lyft Driver with Mercury Insurance Author: Scott Boren Date: Feburary 11, 2016 pp. 8 (Year: 2016).*

Boren S., "Ride-Hailing Insurance for Uber and Lyft Drivers with Mercury Insurance," IronPoint, Published on Feb. 11, 2016, Retrieved from http://www.ironpointinsurance.com/ride-hailing-insurance-for-uber-lyft-drivers-mercury-insurance, Accessed on Feb. 14, 2018, 8 Pages.

"Transportation Network Company Insurance Principles for Legislators and Regulators," National Association of Insurance Commissioners (NAIC), Mar. 31, 2015, pp. 1-28, 31 pages.

* cited by examiner

100

200

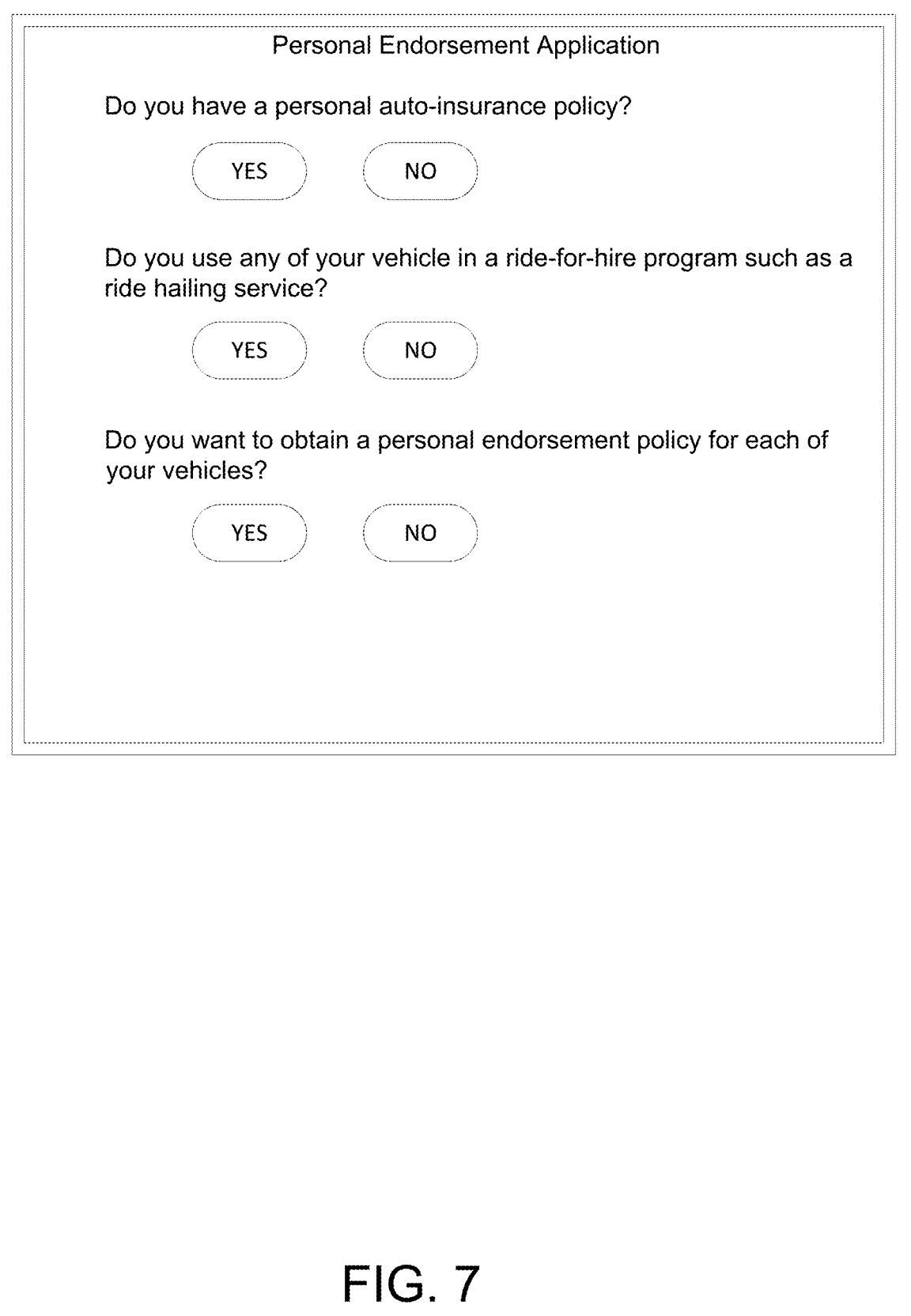

Personal Endorsement Application

Do you have a personal auto-insurance policy?

( YES )    ( NO )

Do you use any of your vehicle in a ride-for-hire program such as a ride hailing service?

( YES )    ( NO )

Do you want to obtain a personal endorsement policy for each of your vehicles?

( YES )    ( NO )

FIG. 7

RIDE FOR HIRE

CROSS-REFERENCE TO RELATED APPLICATIONS

The present application is a continuation-in-part of and claims priority to U.S. patent application Ser. No. 15/052,698 filed on Feb. 24, 2016, which is incorporated by reference in its entirety herein.

TECHNICAL FIELD

Aspects of the disclosure generally relate to computer systems and computer software. For instance, aspects of this disclosure provide for generating a ride hailing application for a mobile device and transmitting the ride hailing application for execution on the mobile device. The ride hailing application may be configured to determine a driver of a vehicle was interacting with the ride hailing application during an accident and update one or more systems or devices based on the determination.

BACKGROUND

In recent years, drivers other than those who drive traditional taxicabs have begun transporting individuals on a for-hire basis as a result of the growing popularity of the ridesharing industry use of "ride hailing" services provided by Transportation Network Companies (TNCs). These drivers contract with TNCs to use their personal vehicle to provide for-hire transport of persons. These drivers are unable to rely on their personal auto insurance when operating in a for-hire transport mode and thereby expose themselves to liability, medical and property damages risks while engaging with a ride hailing service for the reasons discussed above. Particularly, a driver may be considered engaged in for-hire transport of persons (thereby resulting in limited or no coverage by their personal auto insurance) in the following three distinct time periods: (1) when the driver is available and driving around town waiting to receive a notification of a customer looking for a ride (e.g., when the driver logs into the driver's ride hailing company app and/or indicates that they are available for hire), (2) when the driver is in route to pick up a customer, and (3) when the driver is transporting the customer to customer's intended destination. Once drivers are no longer available for hire (e.g., upon dropping off a customer and logging out of the TNC app), they are covered by their personal auto insurance.

In time periods during which drivers are engaged in for-hire transport (e.g., when the driver is in one of the three time periods discussed above), drivers may be covered by an insurance policy provided by the TNC (also herein referred to herein as a TNC insurance policy). However, the TNC insurance policies place a vast amount of out-of-pocket costs on these drivers. As an example, during the first distinct time period discussed above (e.g., when the driver is available for-hire but is not in route to pick up a customer and is not transporting a customer), TNC insurance policies provide very little coverage (e.g., $50,000 of bodily injury per person not to exceed $100,000 and $25,000 of property damage). As a result, the driver may still have significant out-of-pocket costs if the total costs exceed this policy. For instance, if the driver is responsible for $65,000 in property damage that occurred as the result of an accident, the driver would have $40,000 in costs the driver would have to pay using the driver's personal assets. In some cases, drivers may obtain other insurance from a commercial insurance provider different from the TNCs. However, conventional commercial insurance is too expensive for most of these drivers as the commercial insurance premiums are much higher as a result of being designed to provide insurance to traditional taxicabs, which may drive tens of thousands of miles more than drivers of personal vehicles on a for-hire basis.

Accordingly, new systems, devices, methodologies, and software are desired to alleviate the financial burdens placed on drivers who are involved in accidents while engaged in ride hailing activities.

SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

Aspects of the disclosure address one or more issues discussed above by disclosing methods, computer readable media, software systems, and apparatuses for providing a ride hailing application to a mobile device configured to receive telematics data indicating an accident of the vehicle associated with the mobile device and to automatically generate and send metadata of the ride hailing application installed on the mobile device of the driver, the metadata comprising an indication of interaction with the ride hailing application by the driver during the time of the accident as indicated by the telematics data. Based on the metadata received from the mobile device, a period of use of the plurality of periods of use of the ride hailing application executed on the mobile device during which the accident occurred may be determined and a notification to the mobile device based on the determination that the driver was interacting with the ride hailing application may be sent to the mobile device. Further, one or more operational states of the ride hailing application, the mobile device, the vehicle, or another device or system may be updated or altered based on the transmitted notification.

In some embodiments, a system and/or a method may utilize a processor and a memory storing computer-readable instructions that, when executed by the processor, cause the system to perform the operations of generating a ride hailing application, transmitting the ride hailing application to a mobile device of a driver of a vehicle for execution on the mobile device, and receiving, from a telematics device located within the vehicle and one or more sensors of the mobile device and via a wireless connection to the processor, telematics data indicating an accident of the vehicle associated with the mobile device and comprising at least a time associated with the accident and a location of the accident obtained from a location receiver of the mobile device. The system may also automatically generate and send, in response to determining an occurrence of the accident from the telematics data, a metadata request to the ride hailing application executed by the mobile device of the driver, the metadata request comprising a request for metadata of the ride hailing application installed on the mobile device of the driver, the metadata comprising an indication of interaction with the ride hailing application by the driver during the time of the accident as indicated by the telematics data and receive, in response to the metadata request and from the mobile device, the metadata of the ride hailing application for the driver, wherein the metadata comprises one or more events associated with the driver and the ride hailing application, and one or more corresponding timestamps for the one or more events each indicating that the driver was interacting with the ride hailing application, installed on the mobile device of the driver, at the time of the accident. The system may also determine, based on the metadata received from the mobile device, a period of use of the plurality of periods of use of the ride hailing application executed on the mobile device during which the accident occurred, generate and transmit a notification to the mobile device based on the determination that the driver was interacting with the ride hailing application, the notification comprising an identification of the period of use of the plurality of periods of use of the ride hailing application executed on the mobile device during which the accident occurred, and alter, based on the transmitted notification, an operational state of the ride hailing application executed by the mobile device.

Other features and advantages of the disclosure will be apparent from the additional description provided herein.

BRIEF DESCRIPTION OF THE DRAWINGS

A more complete understanding of the present invention and the advantages thereof may be acquired by referring to the following description in consideration of the accompanying drawings, in which like reference numbers indicate like features, and wherein:

FIG. 7 depicts an illustrative user interface for applying for a personal endorsement policy, according to one or more aspect of the disclosure.

DETAILED DESCRIPTION

Figure 1:
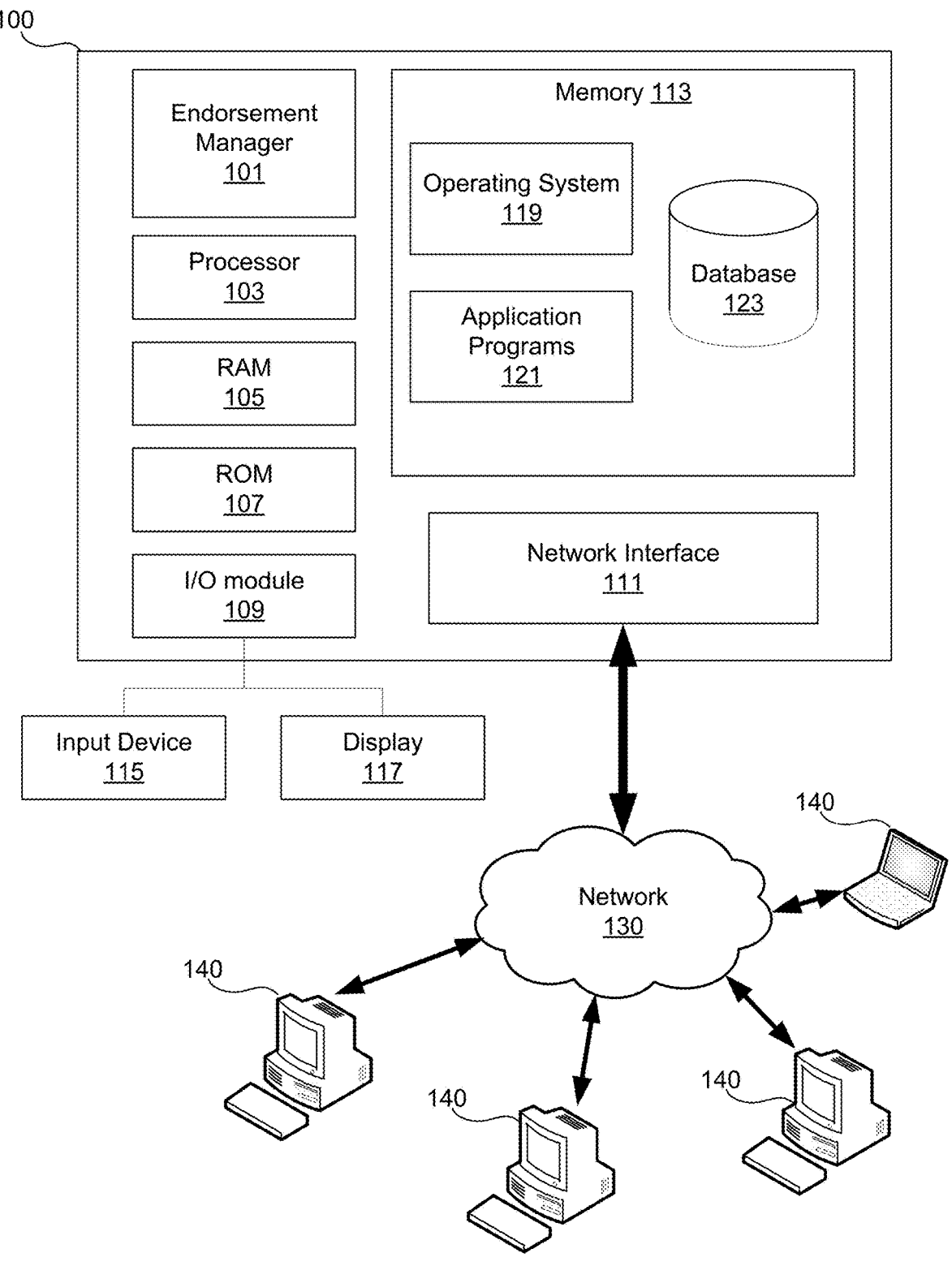
FIG. 1 depicts an illustrative computing system including an illustrative block diagram of an example computing device, according to one or more aspect of the disclosure.

In the following description of the various embodiments, reference is made to the accompanying drawings, which form a part hereof, and in which is shown by way of illustration, various embodiments of the disclosure that may be practiced. It is to be understood that other embodiments may be utilized.

Systems, apparatuses, methods discussed herein provide insurance for individuals who provide rides for others on a for-hire basis (e.g., in return for compensation either from the passenger and/or another entity such as a ride hailing service provider). Currently, in conventional arrangements, an individual's personal auto insurance might not cover such situations and, as a result, the individual may only have insurance provided by a transportation network company (TNC) (also referred to herein as ride hailing companies or services). The systems, apparatuses, and methods discussed herein may provide insurance to these drivers in excess of insurance provided by one or more TNCs. For instance, the system provides insurance that at least matches the insurance the individual would have had under the individual's personal insurance policy where the insurance provided by the TNC does not meet the levels provided under the individual's personal insurance policy. As a result, the individual will be insured up to the levels of the individual's current personal insurance policy.

In one or more arrangements, an insured individual may obtain liability insurance (also referred to herein as "liability coverage" or "liability"). The term "liability insurance" may be insurance that protects an insured individual against loss that the insured individual causes to other persons. Liability insurance may include a bodily injury component and a property damage component. The bodily injury component (also referred to herein as "bodily injury") may provide coverage for injuries sustained by another person because of an accident caused by the insured individual. The property damage component (also referred to herein as "property damage") may provide coverage for damage to another person's property (e.g., vehicle, home, belongings, etc.) as a result of an accident caused by the insured individual. Further, if the insured individual's vehicle is damaged as a result of an accident caused by another person, then that person's property damage component of their liability insurance would cover the repair costs of repairing the insured individual's vehicle.

In one or more arrangements, an insured individual may obtain physical damage insurance (also referred to herein as "physical damage coverage" or "physical damage"). The term "physical damage" may be insurance that provides coverage for damage to the insured individual's own vehicle. Physical damage insurance may include a collision component and a comprehensive component. The collision component (also referred to herein as "collision") provides coverage to any damage to the insured individual's vehicle that occurred as a result of an accident caused by the insured individual. The comprehensive component (also referred to herein as "comprehensive") provides non-accident coverage for any damage to the insured individual's vehicle that occurred as a result of acts of nature (e.g., hail, flood, etc.) or any other reason other than being involved in a collision with another vehicle or object (e.g., damage that occurs as the result of a person breaking into the insured individual's vehicle).

As will be appreciated by one of skill in the art upon reading the disclosure herein, various aspects described herein may be embodied as a method, a computer system, or a computer program product. Accordingly, those aspects may take the form of an entirely hardware embodiment, an entirely software embodiment or an embodiment combining software and hardware aspects. Furthermore, such aspects may take the form of a computer program product stored by one or more computer-readable storage media having computer-readable program code, or instructions, embodied in or on the storage media. Any suitable computer readable storage media may be utilized, including hard disks, CD-ROMs, optical storage devices, magnetic storage devices, and/or any combination thereof. In addition, various signals representing data or events as described herein may be transferred between a source and a destination in the form of electromagnetic waves traveling through signal-conducting media such as metal wires, optical fibers, and/or wireless transmission media (e.g., air and/or space).

In one or more arrangements, teachings of the present disclosure may be implemented with a computing device. FIG. 1 illustrates a block diagram of an example computing device 100 that may be used according to an illustrative embodiment of the present disclosure. The computing device 100 may be similar to any available computing device, such as a personal computer (e.g., a desktop computer), server, laptop computer, notebook, tablet, smartphone, etc. The computing device 100 may include an endorsement manager 101 for performing methods described herein. Endorsement manager 101 may be implemented with a processor and memory. Throughout this disclosure, endorsement manager 101 may be used to reference a combination of the processor and memory storing instructions executed by that processor and/or the instructions themselves. The processor of endorsement manager 101 may operate in addition to or in conjunction with another processor 103 of the computing device 100. Both endorsement manager 101 and processor 103 may be capable of controlling operations of computing device 100 and its associated components, including RAM 105, ROM 107, an input/output (I/O) module 109, a network interface 111, and memory 113.

The I/O module 109 may be configured to be connected to an input device 115, such as a microphone, keypad, keyboard, touchscreen, and/or stylus through which a user of the computing device 100 may provide input data. The I/O module 109 may also be configured to be connected to a display device 117, such as a monitor, television, touchscreen, etc., and may include a graphics card. The display device 117 and input device 115 are shown as separate elements from the computing device 100, however, they may be within the same structure. Using the input device 115, system administrators may update various aspects of endorsement manager 101, such as endorsement policy parameters, described in further detail below. On a serverside computing device 100, the input device 115 may be operated by administrators to interact with endorsement manager 101, including being presented with applications for endorsements for operating a personal vehicle in a ride-for-hire program, as described in further detail below.

Memory 113 may be any computer readable medium for storing computer executable instructions (e.g., software). The instructions stored within memory 113 may enable the computing device 100 to perform various functions. For example, memory 113 may store software used by the computing device 100, such as an operating system 119 and application programs 121, and may include an associated database 123.

The network interface 111 allows the computing device 100 to connect to and communicate with a network 130. The network 130 may be any type of network, including a local area network (LAN) and/or a wide area network (WAN), such as the Internet. Through the network 130, the computing device 100 may communicate with one or more computing devices 140, such as laptops, notebooks, smartphones, personal computers, servers, etc. The computing devices 140 may also be configured in the same manner as computing device 100. In some embodiments the computing device 100 may be connected to the computing devices 140 to form a "cloud" computing environment.

The network interface 111 may connect to the network 130 via communication lines, such as coaxial cable, fiber optic cable, etc. or wirelessly using a cellular backhaul or a wireless standard, such as IEEE 802.11, IEEE 802.15, IEEE 802.16 etc. In some embodiments, the network interface may include a modem. Further, the network interface 111 may use various protocols, including TCP/IP, Ethernet, File Transfer Protocol (FTP), Hypertext Transfer Protocol (HTTP), etc., to communicate with other computing devices 140.

Figure 2:
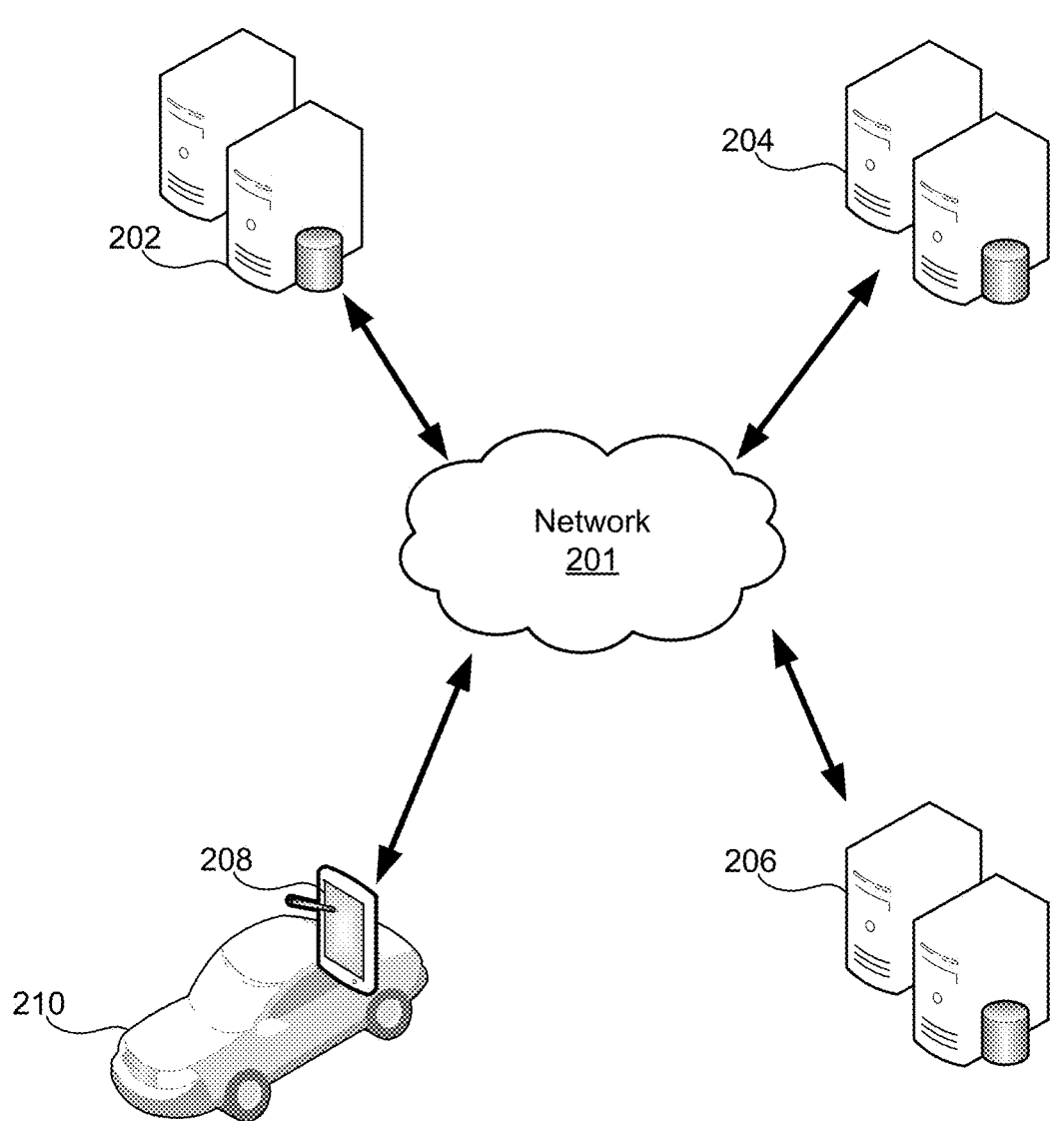
FIG. 2 depicts an illustrative system, according to one or more aspect of the disclosure.

FIG. 2 illustrates an example network environment 200 for implementing methods according to the present disclosure. As shown in FIG. 2, the network environment 200 may include multiple different systems 202-206 communicatively interconnected by network 201, which may be a combination of wired and/or wireless networks. Network 201 may be any type of network (e.g., network 130 described above). In particular, network 201 may include a cellular network and its components, such as base stations, cell towers, antennas, satellites, routers for connecting one device to another. Each system 202-206 may include one or more computing devices (e.g., servers, thin clients, computers, laptops, tablets, etc.), each of which may include the components and functionalities of computing device 100 discussed above. However, only endorsement system 202 may include endorsement manager 101. Additionally, each system 202-206 may include one or more databases for storing and retrieving information.

TNC system 204 (e.g., TNCs, ride hailing companies, etc.) may provide and manage ride hailing services. A TNC uses network 201 and a software application service to connect its customers to transportation services provided by transportation network company drivers. Individuals may contract with TNC system 204 to use their personal vehicle to provide for-hire transport of persons. The TNC system 204 may be configured to generate, edit, manage, and deliver a ride hailing software application (e.g., a mobile app). The ride hailing application may be downloaded, installed, and executed on one or more client-side computing devices such as mobile device 208, which may be a smartphone, a cellular-enabled tablet, a cellular-enable laptop, or other portable device that the user may take into personal vehicle 210. Although FIG. 2 shows vehicle 210 as being a car, vehicle 210 may be a motorcycle, truck, bus, boat, recreational vehicle, etc.

While mobile device 208 is inside vehicle 210, it may communicate with other systems discussed herein (e.g., supplemental endorsement system 202, TNC system 204, commercial insurance system 206, etc.) via a cellular connection or other long-range wireless connection.

In some embodiments, the ride hailing application may be downloaded, installed, and delivered to a computing device of vehicle 210. That is, a vehicle computing device may have similar functionality that a smartphone, tablet, or other client-side computing device may have. A vehicle's computing device, therefore, may be used to interact with the ride hailing application. Thus, herein, where features of the ride hailing application are described as being performed by a client-side computing device (e.g., mobile device 208), it should be understood that they may be performed by a vehicle computing device (such as an on-board vehicle computing device).

The ride hailing application may provide individuals with the ability to notify TNC system 204 when they are available to transport a passenger using their personal vehicle 210 on a for-hire basis by, for example, activating the ride hailing app or selecting a particular onscreen button of the ride hailing app. TNC system 204 may receive notification from persons searching for a ride via an app installed on those persons' mobile devices. TNC system 204 may identify one or more available drivers within the geographic vicinity of the requesting person using location information (e.g., GPS coordinates) provided by the ride hailing app using a GPS receiver of mobile device 208. In some instances, when the driver is in the vicinity, the TNC system 204 may instruct the driver to pick up and transport the customer. In some instances, TNC system 204 may calculate a fare (e.g., the price to be charged for the trip). TNC system 204 may transmit the fare to the requesting person's mobile device for approval. If approval is received, TNC system 204 may transmit a notification to one or more available drivers within the geographic vicinity of the person requesting transport. The notification may also include an amount charged and/or an amount the driver will make for transporting the person. A driver may accept to transport the person via the ride hailing app, which may result in mobile device 208 sending a notification of the driver's acceptance to TNC system 204. The driver may then be deemed to be in route to pick up the person. In order to remedy the gap in insurance coverage due to the exclusionary policy of the driver's personal auto insurance policy, TNC system 204 may provide its drivers with an insurance policy (referred to herein as a TNC insurance policy) to provide the drivers with insurance while the drivers are available for hire, in route to pick up a customer, and/or while transporting the customer, which will be discussed in greater detail below.

In some embodiments, drivers for a ride hailing service may obtain other commercial auto insurance from third party commercial insurance system 206 rather than or in addition to the TNC insurance policy provided by the ride hailing company (e.g., TNC system 204). In such instances, when the TNC system 204 or TNC insurance policy is referred to herein, the same features and methodologies may apply to third party commercial insurance system 206 and its commercial insurance policy.

Supplemental endorsement system 202 may perform one or more aspects discussed herein such as providing a supplemental endorsement policy to individuals who provide rides for others on a for-hire basis such that the individual's total insurance coverage including the individual's TNC insurance and/or commercial insurance at least equals coverage specified in the individual's personal auto insurance policy. Supplemental endorsement policy may also be referred to herein as personal endorsement policy, endorsement policy, or endorsement. Supplemental endorsement system 202 may also provide individuals with personal auto insurance policies. Supplemental endorsement system 202 may store insurance policy information for its customers including a customer's personal insurance policy and/or personal endorsement policy. As an example, supplemental endorsement system 202 may store whether the individual has and/or how much coverage the individual has under a personal insurance policy for liability (e.g., bodily injury, property damage, etc.) and physical damage, and the amount of the individual's deductible, as well as information about the individual such as age, driving history, gender, and the like, and information about the vehicle, such as make, model, year, vehicle identification number, and the like. Additionally, supplemental endorsement system 202 may also store the same type of information for the individual's personal endorsement policy. Supplemental endorsement system 202 may store and execute policies (e.g., rules) for performing various methods discussed herein. The policies may include policies for granting or rejecting an application for insurance from an applicant, calculating a supplemental endorsement coverage amount, retrieving information (e.g., metadata, commercial insurance policy, etc.) from the various other systems 204-206 and/or mobile device 208, and processing a claim, each of which will be discussed in further detail below.

Figure 3:
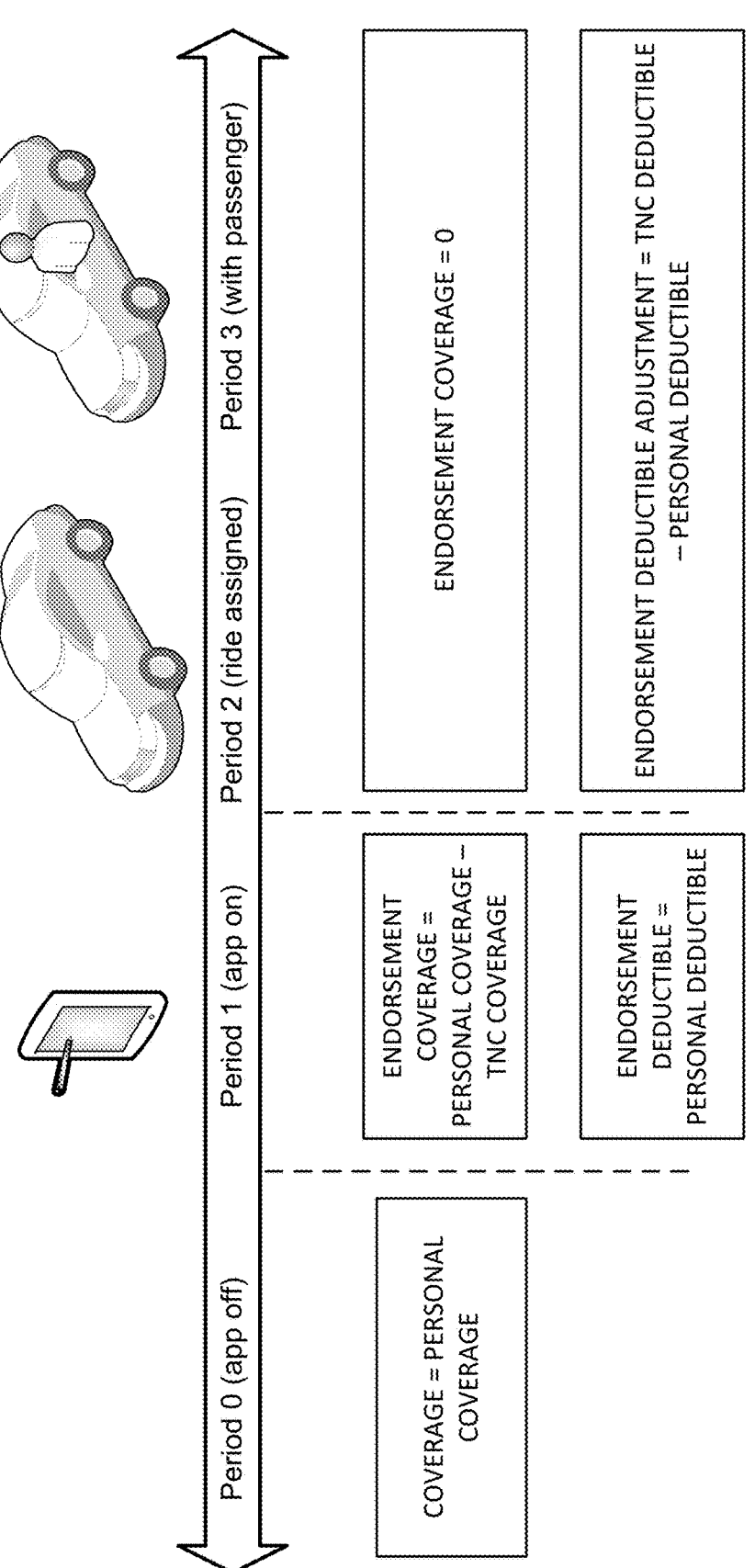
FIG. 3 depicts an illustrative timeline for coverage by event-varying insurance policies, according to one or more aspect of the disclosure.

FIG. 3 depicts an illustrative timeline of insurance coverage by event-varying insurance policies, according to one or more aspect of the disclosure. As discussed above, supplemental endorsement system 202 provides insurance coverage to match what the driver would have had under the driver's personal policy while also accounting for coverage provided by TNC system 204 or one or more other commercial insurance providers 206. The driver's personal insurance policy and the driver's personal endorsement policy may both be provided by supplemental endorsement system 202. As used herein, period 0 may refer to a time period during which a driver is not available for transporting persons on a for-hire basis. As a result, during period 0, the driver is covered by the driver's personal insurance policy for all coverage (e.g., coverage for liability (e.g., bodily injury, and/or property damage costs) and physical damage) resulting from use of driver's personal vehicle 210 since the criteria invoking its exclusionary policy would not be met. Period 0 may be determined by, for example, determining that the driver has closed the ride hailing app or selected an icon to indicate that the driver is not available to pick up passengers. When the ride hailing app is closed and/or the icon indicating that the driver is not available to pick up passengers is selected, mobile device 208 may transmit an indication that the driver is not available to pick up passengers to TNC system 204, which may record the indication along with its timestamp in its database. Recording events (e.g., indications of status) along with their timestamp may be referred to as metadata.

As used herein, period 1 may refer to a time period (e.g., a standby period) during which the driver has notified TNC system 204 that the driver is available to transport persons on a for-hire basis but has not yet accepted a passenger or delivery assignment from a TNC or any other company that connects its customers to transportation services or provides transportation services. For instance, the driver may open the ride hailing application or select an onscreen button of the ride hailing app to indicate that the driver is available and standing by for an assignment. In response, mobile device 208 may transmit a message indicating that the driver is now available to TNC system 204, which may then store the indication and a timestamp of when the driver became available in its database. During period 1, a driver's personal insurance policy might not provide coverage (due to exclusions in the policy regarding for-hire transport). However, the driver may have coverage under a TNC insurance policy provided by the TNC. In addition, a driver who has obtained a personal endorsement policy from supplemental endorsement system 202 may receive coverage such that the personal endorsement policy in combination with the driver's TNC insurance policy (and any other commercial insurance policy) would match the coverage of the driver's personal insurance policy (e.g., same coverage for property damage, bodily injury, physical damage, etc.). As a result, the total amount of coverage provided by personal endorsement policy may equal the amount coverage provided by the driver personal insurance policy minus the amount of coverage provided by the driver's TNC insurance policy (and minus the amount of coverage provided by other commercial insurance policies). In some arrangements, the driver's personal endorsement policy may include the same deductible or substantially similar deductible to that of the driver's personal insurance policy, as will be discussed more fully below.

Figure 4:
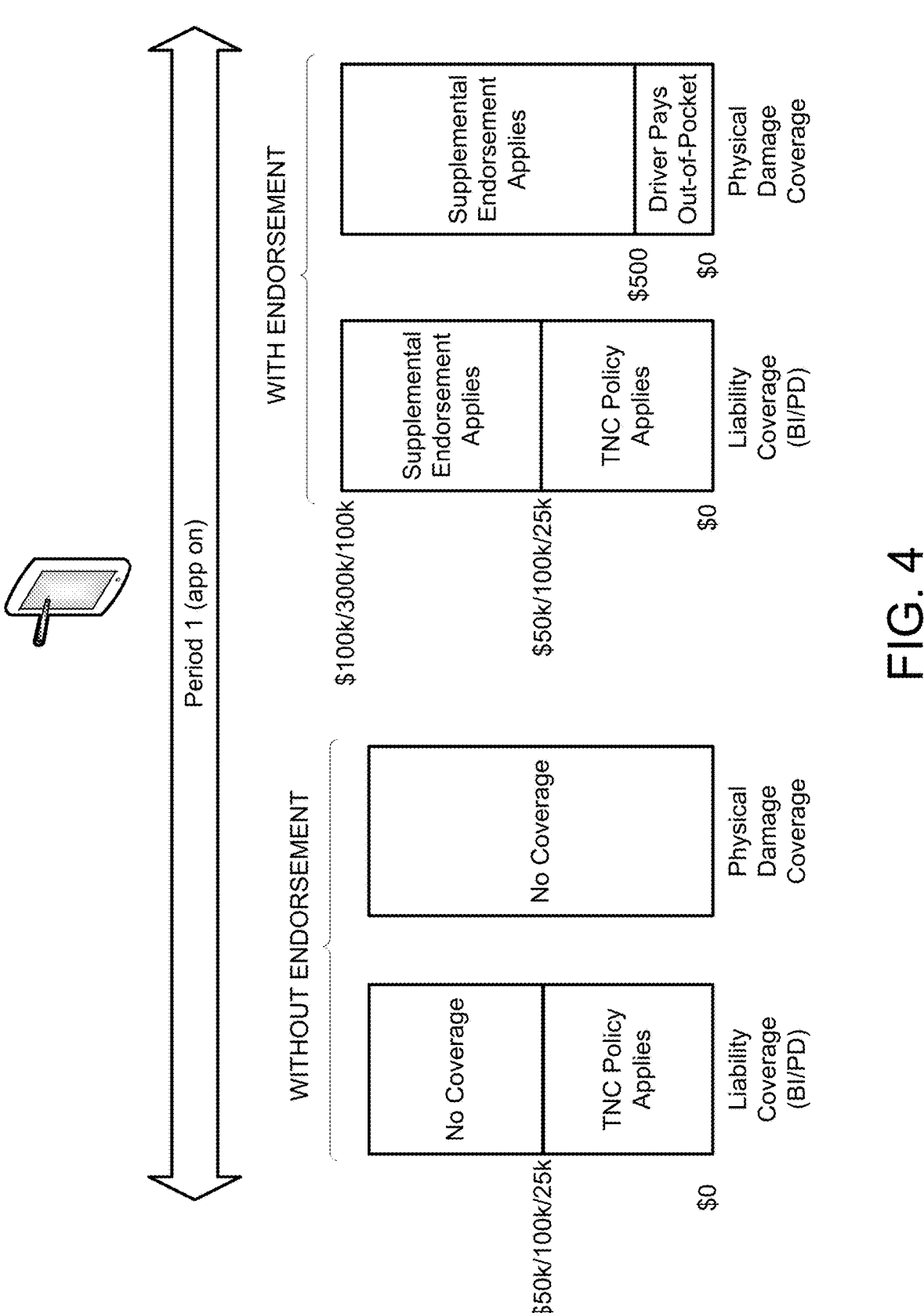
FIG. 4 depicts illustrative coverage scenarios for period 1 of the illustrative timeline, according to one or more aspect of the disclosure.

FIG. 4 depicts an illustrative example of coverage scenarios for period 1 of the illustrative timeline shown in FIG. 3, according to one or more aspect of the disclosure. In this example, a driver may have personal insurance policy that provides liability coverage of $100,000 of bodily injury damage per person not to exceed $300,000 in total bodily injury damages and $100,000 in property damages. Additionally, the driver's personal insurance policy may have a deductible of $500 for physical damage coverage that the driver may pay before the provider of the personal insurance policy will pay a claim.

In the event the driver does not have a personal endorsement policy, the driver may only be covered for bodily injury, property damage and/or physical damage costs by the driver's TNC insurance policy and/or another commercial insurance policy, and might not be covered by the driver's personal insurance policy. Typically, TNC insurance policies provide a low total amount of insurance coverage during period 1. In one example, the driver's TNC insurance policy may provide liability coverage of $50,000 of bodily injury damages per person not to exceed $100,000 in total bodily injury damages and $25,000 of property damages as shown in FIG. 4, which is substantially less coverage than the driver's personal insurance policy. As a result, any liability damages (e.g., bodily injury damages, property damages, etc.) in excess of the amounts provided in the TNC insurance policy, the driver may be personally liable for and have to pay for such damages using the driver's personal assets. Further, the driver's TNC insurance policy might not have insurance coverage for physical damage during period 1.

However, in the event the driver has a personal endorsement policy during period 1, the driver's total liability coverage (e.g., bodily injury, property damage, physical damage, etc.) may be the sum of both the driver's TNC insurance policy and the driver's personal endorsement policy. As discussed above, the personal endorsement policy is designed to provide the driver with additional coverage in excess of the TNC insurance policy so that the driver's total coverage is equal to the driver's personal insurance policy. For instance, the coverage provided by the personal endorsement policy may equal the difference between the coverage provided by the driver's personal insurance policy and the coverage provided by the TNC insurance policy (e.g., the coverage provided by the personal insurance policy minus the coverage provided by the TNC insurance policy, as shown in FIG. 3). As an example, the driver's personal insurance policy may provide liability coverage of $100,000 of bodily injury damage per person not to exceed $300,000 in total bodily injury damages, and $100,000 in property damages. The driver's TNC insurance policy may provide $50,000 in bodily injury damages not to exceed $100,000 in total bodily injury damages, and $25,000 in property damage. In such an example, the per person bodily injury coverage provided by the personal endorsement policy may be computed to be $50,000 (since $100,000 minus $50,000 equals $50,000). In addition, the coverage limit for bodily injury provided by the personal endorsement policy may be computed to be $200,000 (since $300,000 minus $100,000 equals $200,000). Further, the property damage coverage provided by the personal endorsement policy may be computed to be $75,000 (since $100,000 minus $25,000 equals $75,000). As a result, the driver's total bodily injury coverage may be the amount of bodily injury coverage provided by the TNC insurance policy (e.g., $50,000 in bodily injury damages not to exceed $100,000 in total bodily injury damages) and the amount of bodily injury coverage provided by the personal endorsement policy (e.g., $50,000 in bodily injury damages not to exceed $200,000 in total bodily injury damages), which when summed equal the amount of bodily injury coverage provided by the driver's personal insurance policy (e.g., $100,000 of bodily injury damage per person not to exceed $300,000 in total bodily injury damages). The driver's total property damage coverage may be the amount of property damage coverage provided by the TNC insurance policy (e.g., $25,000) and the amount of property damage coverage provided by the personal endorsement policy (e.g., $75,000), which when summed equal the amount of property damage coverage provided by the driver's personal insurance policy (e.g., $100,000).

During period 1, in addition to the personal endorsement policy providing coverages in excess of coverage provided by the TNC insurance policy up to the coverage provided by the personal insurance policy, the personal endorsement policy may also include a deductible for physical damage in some instances. Generally, a deductible for physical damage under the personal endorsement policy may be the difference between the deductible for physical damage under the personal insurance policy and the deductible for physical damage under the TNC insurance policy. However, during period 1, the TNC insurance policy might not provide coverage for physical damage and, as a result, might not include a corresponding deductible for physical damage. In such cases, the deductible for physical damage under the driver's personal endorsement policy may be equal to the deductible for physical damage under the driver's personal insurance policy, so that the driver has the same deductible for physical damage as the driver would have had under the driver's personal insurance policy. As an example, the deductible for physical damage under the personal insurance policy may be $500 and, during period 1, the TNC insurance policy might not include a deductible since the TNC insurance policy might not provide coverage for physical damage. Thus, during period 1, the deductible for physical damage under the personal endorsement policy may be $500 (since there is no deductible under the TNC insurance policy). As a result, the driver's total deductible for physical damage would equal the amount of the driver's deductible for physical damage under the driver's personal insurance policy (e.g., $500), as shown in FIG. 3.

During period 1, the personal endorsement policy increases the driver's liability coverage and physical damage coverage, but also includes a deductible for physical damage. In the above example, the personal endorsement policy increases the driver's total bodily injury coverage from $50,000 per person up to $100,000 in total to $100 k per person up to $300,000 in total. In addition, the personal endorsement policy increases the property damage coverage from $25,000 to $100,000, but also applies a deductible for physical damage of $500.

Referring back to FIG. 3 and as used herein, periods 2 and 3 may refer to a time period during which the driver has been notified via the ride hailing application that an individual has been assigned to the driver for pickup and a time period during which the driver may be transporting the individual, respectively. During periods 2 and 3, the driver might not be covered by the driver's personal insurance policy due to its exclusionary policy. During periods 2 and 3, the TNC insurance policy may provide a greater amount of coverage (e.g., bodily damage coverage, property damage coverage) than the personal insurance policy. As a result, the liability coverage provided by the personal endorsement policy may be $0 since the liability coverage under the TNC insurance policy is greater than or equal to the liability coverage under the personal insurance policy. However, while the personal endorsement policy might not provide coverage for bodily injury or property damage, the personal endorsement policy may provide deductible adjustment coverage if a deductible under the TNC insurance policy is greater than a deductible under the personal insurance policy so that the driver pays a deductible that is equal to the driver's deductible under the driver's personal insurance policy. The deductible adjustment coverage may be equal to the deductible under the driver's TNC insurance policy minus the deductible under the driver's personal insurance policy. As a result, the driver may only pay an amount equal to the driver's deductible under the driver's personal insurance policy. The personal endorsement policy may provide coverage for the difference between deductible under the TNC insurance policy and the deductible under the personal insurance policy. However, in some cases, there may be maximum limit on the amount of deductible adjustment coverage provided by the personal endorsement policy.

Figure 5:
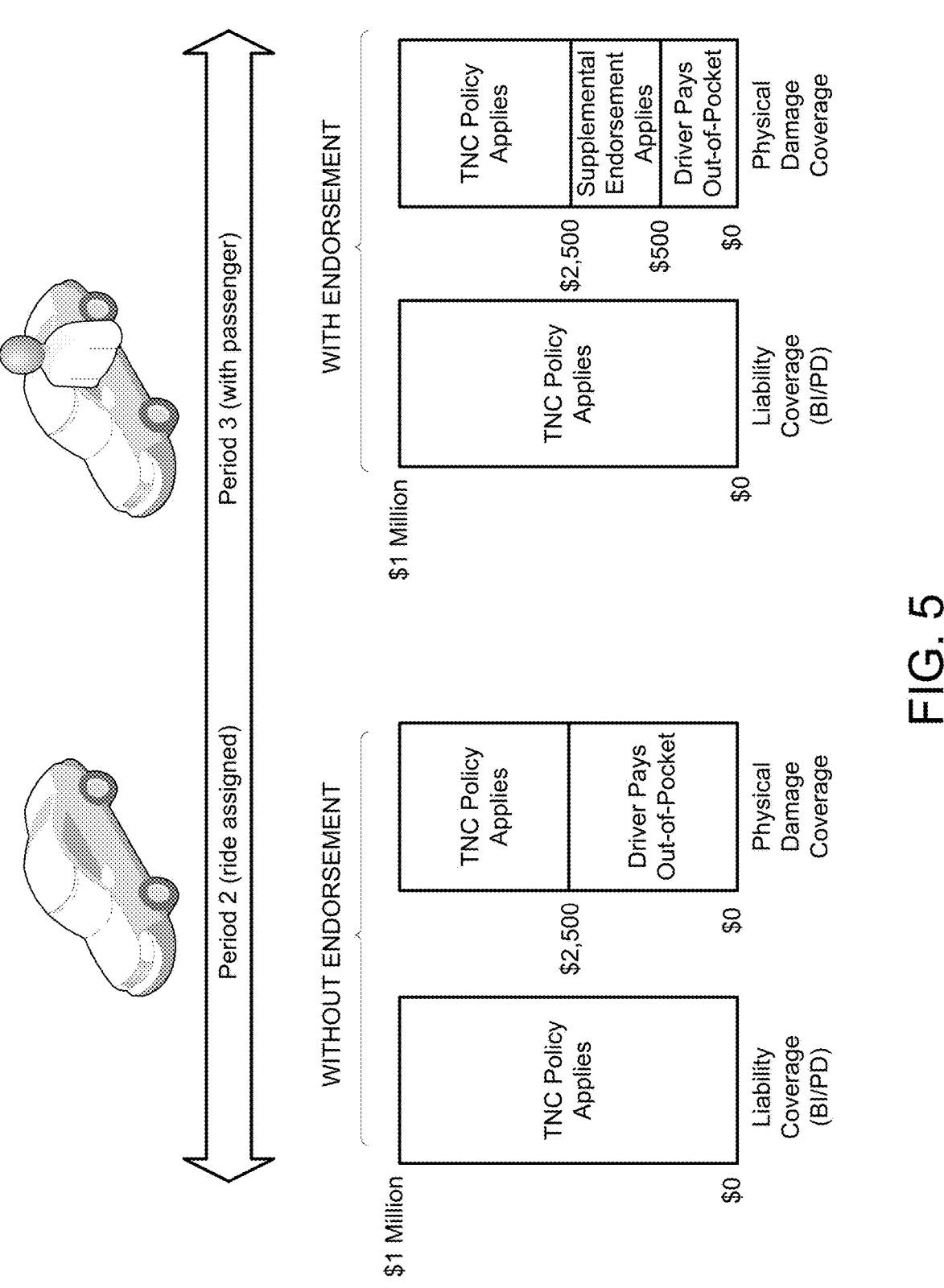
FIG. 5 depicts illustrative coverage scenarios for periods 2 and 3 of the illustrative timeline, according to one or more aspect of the disclosure.

FIG. 5 depicts an illustrative example of coverage scenarios for periods 2 and 3 of the illustrative timeline shown in FIG. 3, according to one or more aspect of the disclosure. Again, in this example, the driver may have a personal automobile insurance policy that provides liability coverage of $100,000 of bodily injury damage per person not to exceed $300,000 in total bodily injury damages and $100,000 in property damages. Additionally, the driver's personal insurance policy may have a deductible of $500 for physical damage that the driver may pay before the provider of the personal insurance policy will pay a claim.

In the event the driver does not have a personal endorsement insurance policy, the driver may only be covered for liability and/or physical damage costs by the driver's TNC insurance policy or another commercial insurance policy. Typically, a TNC insurance policy may provide a high total amount of liability coverage during periods 2 and 3. As an example, the TNC insurance policy may provide $1 million in liability coverage for bodily injury and property damage as shown in FIG. 5, which is substantially more coverage than the driver's personal insurance policy. As a result, the driver will likely only be liable for the out-of-pocket deductible for physical damage, which may be much higher than the driver's deductible for physical damage under the driver's personal insurance policy. As an example and as shown in FIG. 5, the deductible for physical damage under the TNC insurance policy is $2,500, which is $2,000 more than the $500 deductible for physical damage under the driver's personal insurance policy.

However, in the event the driver has a personal endorsement insurance policy, the driver's total liability coverage (e.g., bodily injury, property damage) may remain the same as without having the personal endorsement policy since the amount of coverage for bodily injury and/or property damage provided by the personal endorsement policy is $0 in periods 2 and 3. As discussed above, during periods 2 and 3, the personal endorsement policy may provide deductible adjustment coverage. The deductible adjustment coverage may be equal to the deductible under the driver's TNC insurance policy minus the deductible under the driver's personal insurance policy. As shown in FIG. 5, the deductible for physical damage under the TNC insurance policy may be $2,500. The deductible for physical damage under the personal insurance policy may be $500. As a result, the deductible adjustment coverage under the personal endorsement policy may be $2,000 ($2,500 minus $500). Because the driver's deductible for physical damage is much lower under the driver's personal insurance policy than under the driver's TNC insurance policy, the driver may be covered for up to $2,000 ($2,500-$500) deductible adjustment by the personal endorsement policy so that the driver only has to pay an out-of-pocket deductible for physical damage that the driver would have paid under the driver's personal insurance policy (e.g., up to $500). As an example, an accident may result in physical damages costs of $5,000. In such an example, the driver may pay a $500 deductible and the personal endorsement system 204 may pay $2,000 dollars (e.g., a deductible adjustment) to cover the difference in the deductible of the personal insurance policy from the deductible of the TNC insurance policy. The remaining costs may be paid by the TNC who provided the TNC insurance policy.

Accordingly, as the coverages and deductibles of the TNC insurance policy change over the different periods, so too do the coverages and deductibles of the personal endorsement policy over the different periods.

Figure 6:
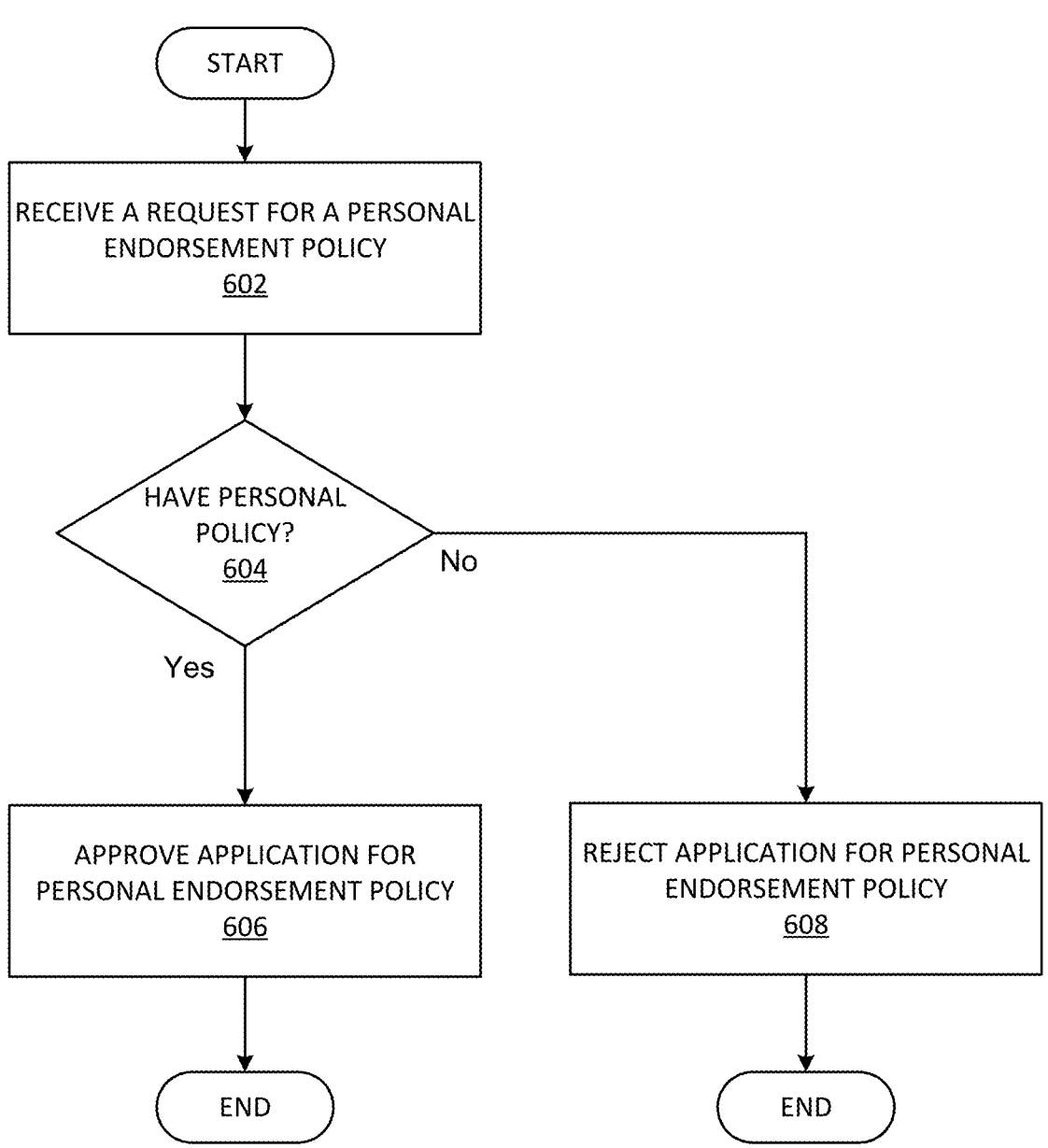
FIG. 6 depicts an illustrative method for applying for a personal endorsement policy, according to one or more aspect of the disclosure.

FIG. 6 depicts an illustrative method for applying for a personal endorsement policy, according to one or more aspect of the disclosure. The method of FIG. 6 and/or one or more steps thereof may be performed by a computing device of supplemental endorsement system 202. The method illustrated in FIG. 6 and/or one or more steps thereof may be partially or fully embodied, for example, in computer-executable instructions that are stored in a computer-readable medium, such as a non-transitory computer-readable memory. In some instances, one or more steps of FIG. 6 may be performed in a different order and/or combined. In some instances, one or more steps of FIG. 6 may be omitted and/or otherwise not performed.

As shown in FIG. 6, the method may begin at step 602 in which supplemental endorsement system 202 may receive an application request for a personal endorsement policy from a driver so that the driver may have additional insurance coverage when participating in ride hailing services. The driver may be referred to herein as an applicant. The request may be generated using a web browser or an insurance application (e.g., mobile app) installed on mobile device 208. Mobile device 208 may transmit the request to supplemental endorsement system 202. In some instances, the request may be transmitted from a computing device different from mobile device 208.

At step 604, supplemental endorsement system 202 may determine whether the applicant has a personal insurance policy with supplemental endorsement system 202. For instance, supplemental endorsement system 202 may use an identifier of the applicant (name, customer ID, etc.) to lookup in a database of current personal insurance policies of customers of the supplemental endorsement system 202 to determine whether there is a matching record in the database. If there is not a matching record, supplemental endorsement system 202 may determine that the applicant does not currently have a personal insurance policy with supplemental endorsement system 202 and, as a result, may reject the application for the personal endorsement policy in step 608. Supplemental endorsement system 202 may send a message indicating the rejection of the application to mobile device 208 for display to the applicant via the web browser or the insurance application. In some instances, the message may also include instructions and/or links for the applicant to first apply and obtain a personal insurance policy with supplemental endorsement system 202 in order to satisfy one criterion for obtaining the personal endorsement policy. Further, the message may also indicate other criteria that may be satisfied in order to obtain the personal endorsement policy (e.g., that the applicant should also have a TNC insurance policy, etc.). Otherwise, if there is a matching record, supplemental endorsement system 202 may determine that the applicant currently has a personal insurance policy with supplemental endorsement system 202 and, as a result, may proceed to step 606.

Alternatively, in some embodiments, rather than obligating the applicant to have a personal insurance policy with supplemental endorsement system 202, supplemental endorsement system 202 may simply determine whether the applicant has a personal insurance policy with any insurance company. If the applicant indicates that the applicant has a personal insurance policy with another company, supplemental endorsement system 202 may proceed to step 606. In such embodiments, supplemental endorsement system 202 may retrieve a copy of the driver's personal insurance policy from the provider of the personal insurance policy.

At step 606, supplemental endorsement system 202 may approve the applicant for a personal endorsement policy, calculate the amount of coverage for each period as discussed herein, and send an approval message to mobile device 208 for display to the applicant via the web browser or the insurance application. The approval message may include an indication that the application has been approved, the amount of coverage provided by the personal endorsement policy during each period, and criteria for maintaining the personal endorsement policy. The criteria for maintaining the personal endorsement policy may include maintaining a current personal insurance policy with supplemental endorsement system 202, and/or staying up-to-date with payment of insurance premiums (e.g., an insurance premium for the personal insurance policy, an insurance premium for the personal endorsement policy, and the like). If the criteria for maintaining the personal endorsement policy are not maintained, the personal endorsement policy may be voided.

FIG. 7 depicts an illustrative user interface for applying for a personal endorsement policy, according to one or more aspect of the disclosure. The user interface may be displayed by either a web browser or an insurance application installed on mobile device 208. The applicant may answers various questions illustrated in FIG. 7 to enable supplemental endorsement system 202 to determine whether to approve an application for a personal endorsement policy. In one or more alternative arrangements, the applicant might not be asked any questions and may be approved automatically and/or in response to a determination that the applicant drives for a TNC and/or has a personal insurance policy with the supplemental endorsement system 202. In such arrangements, the process of FIG. 6 may only include steps 602 and 606.

Figure 8:
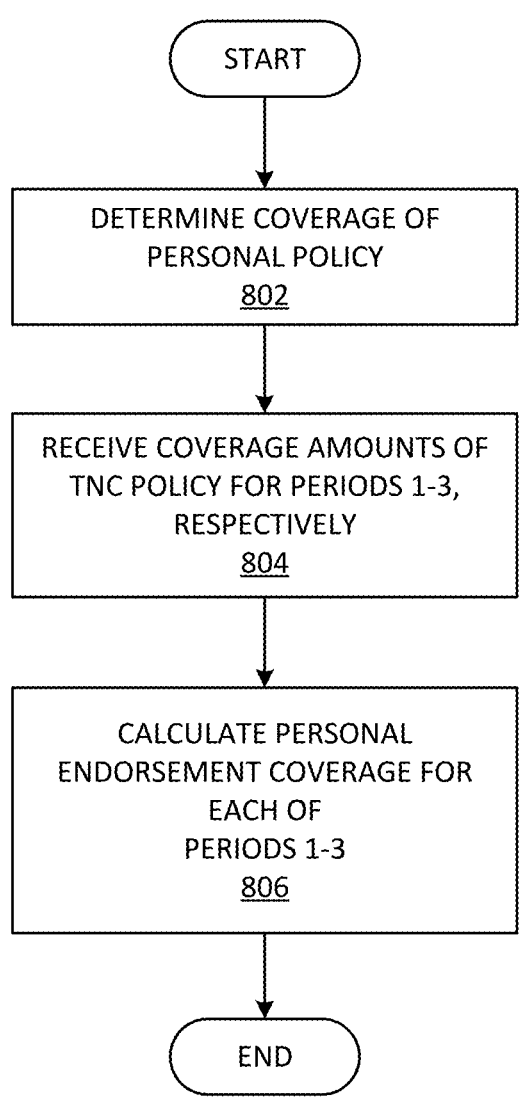
FIG. 8 depicts an illustrative method for determining an amount of coverage for a personal endorsement policy, according to one or more aspect of the disclosure.

FIG. 8 depicts an illustrative method for determining an amount of coverage for a personal endorsement policy, according to one or more aspect of the disclosure. The method of FIG. 8 and/or one or more steps thereof may be performed by a computing device of supplemental endorsement system 202. The method illustrated in FIG. 8 and/or one or more steps thereof may be partially or fully embodied, for example, in computer-executable instructions that are stored in a computer-readable medium, such as a non-transitory computer-readable memory. In some instances, one or more steps of FIG. 8 may be performed in a different order and/or combined. In some instances, one or more steps of FIG. 8 may be omitted and/or otherwise not performed. The steps of FIG. 8 may be performed during the application process or, alternatively, after a claim under the driver's personal endorsement policy has been submitted to supplemental endorsement system 202.

As shown in FIG. 8, the method may begin at step 802 in which supplemental endorsement system 202 may determine the amount of coverage provided by the applicant's personal insurance policy. Supplemental endorsement system 202 may retrieve the applicant's personal insurance policy from a database of current personal insurance policies using a lookup identifier (e.g., the applicant's name, customer number, etc.). Following the above example in FIGS. 3-5, the applicant's personal insurance policy provides liability coverage of $100,000 of bodily injury damage per person not to exceed $300,000 in total bodily injury damages and $100,000 in property damages. Additionally, the driver's personal insurance policy may have a deductible of $500 for physical damage that the driver may pay before the provider of the personal insurance policy will pay a claim. Alternatively, if the driver has a personal insurance policy with a different entity rather than the supplemental endorsement system 202, the supplemental endorsement system 202 may retrieve the driver's personal insurance policy from the entity (by sending a request including information identifying the driver and receiving the personal insurance policy), and analyze the personal insurance policy to determine various coverages and deductibles.

At step 804, supplemental endorsement system 202 may receive coverage amounts of TNC insurance policy for the various time periods. Supplemental endorsement system 202 may send a request to TNC system 204 for one or more (e.g., each) of the coverage amounts during periods 1-3 discussed above for the applicant/driver. In response, supplemental endorsement system 202 may receive the one or more (e.g., each) of the coverage amounts. Following the above example from FIGS. 3-5, the TNC insurance policy may provide, for period 1, coverage of $50,000 of bodily injury damages not to exceed $100,000 in total bodily injury damages and coverage of $25,000 of property damages, and might not have a deductible for physical damage as shown in FIG. 4. Additionally, the coverage amounts provided by the TNC insurance policy, for periods 2 and 3, may include $1 million of liability coverage for bodily injury and property damage, and have a $2,500 deductible for physical damage as shown in FIG. 5.

At step 806, supplemental endorsement system 202 may calculate an amount of available coverage under the personal endorsement policy for each of periods 1-3 such that the total amount of coverage provided by both the TNC insurance policy and the personal endorsement policy is at least equal to the amount coverage provided by the driver's personal insurance policy. As a general rule, during period 1, the coverage provided by the personal endorsement policy may be at least equal to the coverage provided by the personal insurance policy minus the coverage provided by the TNC insurance policy. As another general rule, during period 1, the deductible for physical damage set forth in the personal endorsement policy may be equal to the deductible for physical damage set forth in the personal insurance policy. As yet another general rule, during periods 2 and 3, the coverage provided by the personal endorsement policy may be assigned to be $0. As still yet another general rule, during periods 2 and 3, the endorsement deductible adjustment may equal the deductible for physical damage under the TNC insurance policy minus the deductible for physical damage under the personal insurance policy.

Following the example from FIGS. 3-5, during period 1, supplemental endorsement system 202 may calculate the amount of liability coverage provided by the personal endorsement policy by subtracting the amount liability coverage under the TNC insurance policy from the amount of liability coverage under the personal insurance policy. That is, supplemental endorsement system 202 may subtract $50,000 of bodily injury damages per person coverage provided by the TNC insurance policy from the $100,000 of bodily injury damage per person coverage provided by the personal insurance policy to determine that the personal endorsement policy may provide $50,000 of bodily damages per person coverage during period 1. Supplemental endorsement system 202 may subtract $100,000 in total bodily damages coverage provided by the TNC insurance policy from the $300,000 in total bodily injury damages coverage provided by the personal insurance policy to determine that the personal insurance endorsement policy may provide $200,000 in total bodily injury damages coverage during period 1. In addition, supplemental endorsement system 202 may subtract $25,000 of property damage coverage provided by the TNC insurance policy from the $100,000 of property damage coverage provided by the personal insurance policy to determine that the personal endorsement policy may provide $75,000 in property damage coverage during period 1.

Additionally, supplemental endorsement system 202 may compute the deductible for physical damage for period 1. In the above example, because there is no coverage during period 1 under the TNC insurance policy, the deductible set forth under the personal endorsement policy may be the same amount as the driver's personal insurance policy (e.g., $500).

In some embodiments, during period 1, the TNC insurance policy might not provide physical damage coverage, collision coverage, and the like. In such embodiments, the TNC insurance policy would not have a deductible since there is no physical damage coverage. In such cases, supplemental endorsement system 202 may apply coverage for physical damage using the personal endorsement policy and, as a result, assign a deductible for physical damage and/or collision coverage under the personal endorsement policy to be equivalent to the deductible for physical damage and/or collision coverage under the personal insurance policy (e.g., $500 in the above examples).

Following the above example, for periods 2 and 3, supplemental endorsement system 202 might not provide liability coverage (e.g., bodily injury coverage, property damage coverage, and the like). That is, the liability coverage under the personal endorsement policy may be $0. Further, supplemental endorsement system 202 may determine that the deductible for physical damage set forth in the TNC insurance policy is more than the deductible for physical damage set forth in the personal insurance policy and, thus, calculate that an endorsement adjustment amount to pay to either the driver or, alternatively, the TNC system 204 on behalf of the driver is $2,000 (e.g., $2,500-$500). On the other hand, if the deductible for physical damage set forth in the TNC insurance policy (e.g., $100) is less than the deductible for physical damage set forth in the personal insurance policy (e.g., $500), the deductible set forth under personal endorsement policy may be $0 and there might not be an endorsement deductible adjustment to pay out to either the driver or to the TNC system 204 on behalf of the driver.

In some instances, the liability insurance may be broken down by bodily injury coverage and property damage coverage and supplemental endorsement system 202 may separately calculate the bodily injury coverage and the property damage coverage for the personal endorsement policy using the same methodology discussed above for liability coverage.

Figure 9A:
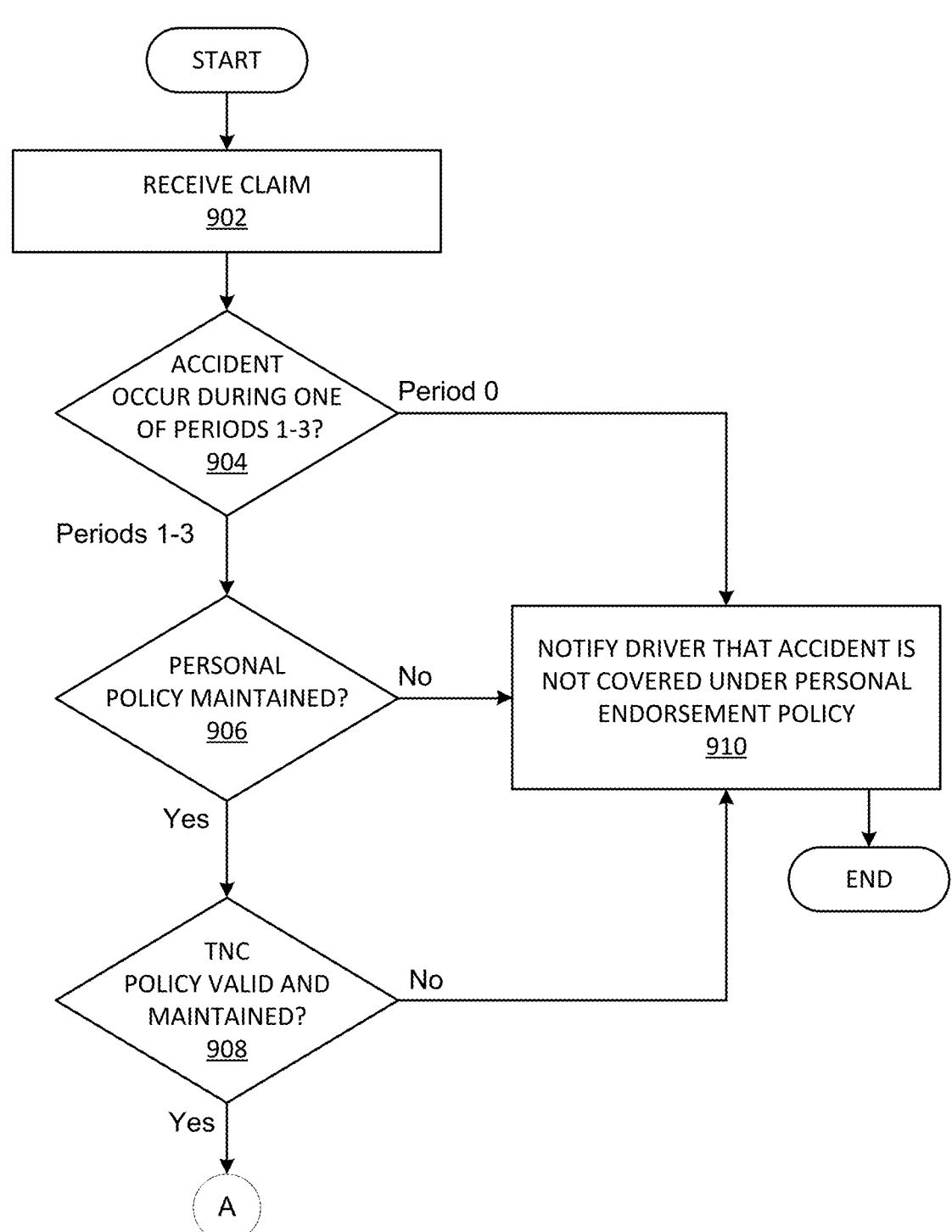
FIGS. 9A and 9B depict an illustrative method for processing a claim, according to one or more aspect of the disclosure.
Figure 9B:
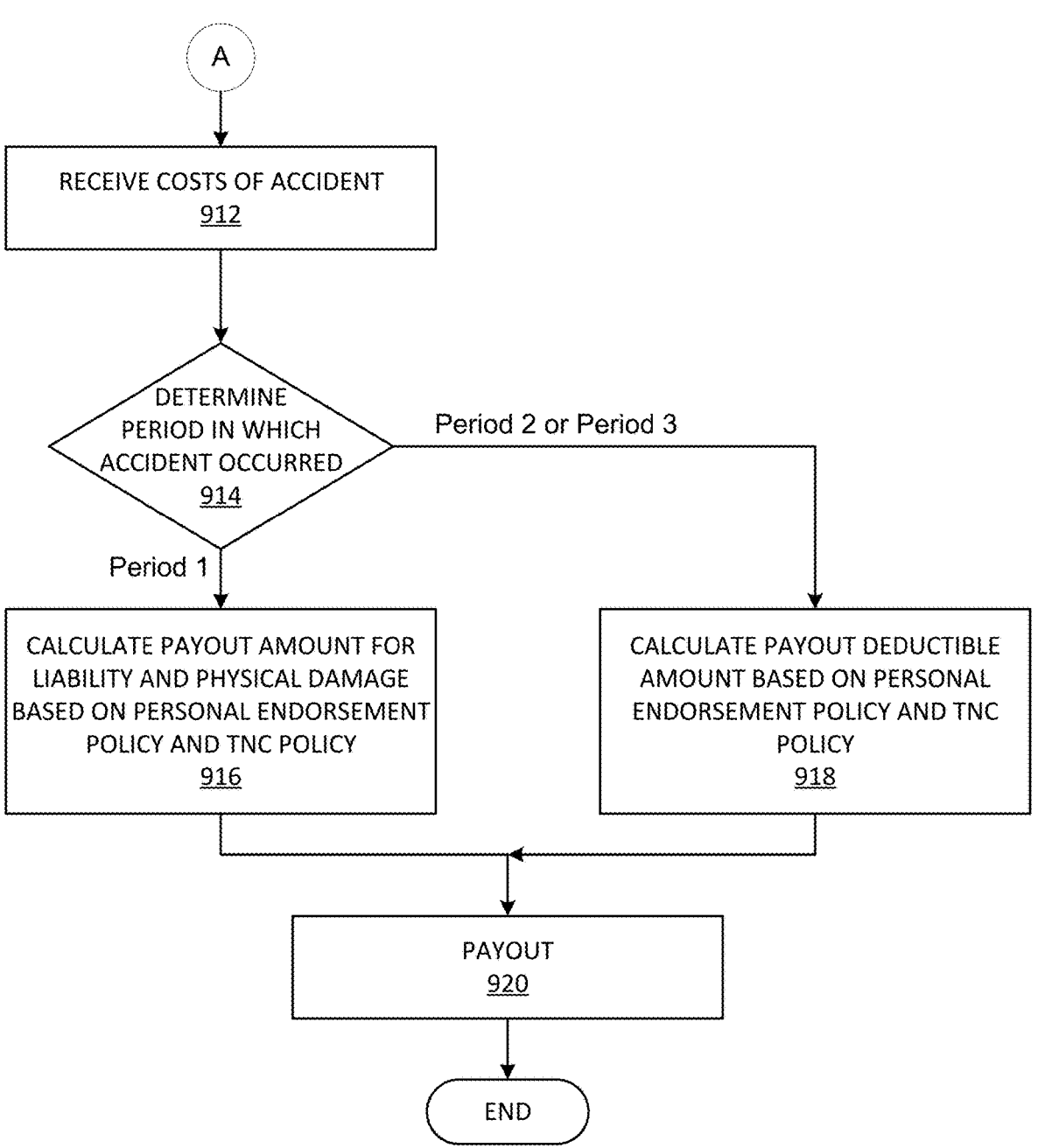

FIGS. 9A and 9B depict an illustrative method for processing a claim, according to one or more aspect of the disclosure. The method of FIGS. 9A and 9B and/or one or more steps thereof may be performed by a computing device of supplemental endorsement system 202. The method illustrated in FIGS. 9A and 9B and/or one or more steps thereof may be partially or fully embodied, for example, in computer-executable instructions that are stored in a computer-readable medium, such as a non-transitory computer-readable memory. In some instances, one or more steps of FIGS. 9A and 9B may be performed in a different order and/or combined. In some instances, one or more steps of FIGS. 9A and 9B may be omitted and/or otherwise not performed.

As shown in FIG. 9A, the method may begin at step 902 in which supplemental endorsement system 202 may receive a claim after the driver's vehicle has been in a vehicular accident. The claim may have been submitted by the driver or another person or entity. A claim may be a request for supplemental endorsement system 202 to make a payout based on terms of the personal endorsement policy.

At step 904, supplemental endorsement system 202 may determine whether the accident occurred during one of periods 1-3. Supplemental endorsement system 202 may receive the time of the accident or determine the time of the accident based on the claim or other information (e.g., telematics data from a telematics device located within the vehicle and receiving data from one or more sensors, such as impact sensors, speed sensors, directional sensors, and the like, from data collected from the mobile device of the driver, and the like). After the time of the accident has been received, supplemental endorsement system 202 may send a metadata request to one or more of mobile device 208 and/or TNC system 204 (e.g., the ride hailing company). The metadata request may include the time of the accident and may request either the metadata of ride hailing application and/or an indication of which period the driver was in at the time of the accident.

When the driver performs a ride hailing event such as turning on or off the ride hailing app, notifying TNC system 204 that the driver is available or no longer available for transporting persons, notifying TNC system 204 that the driver is in route to pick up a person, notifying TNC system 204 that the person has picked up the customer, notifying TNC system 204 that the person or customer has been dropped off at a destination, etc., such events and the times the events occurred may be logged by ride hailing application installed on mobile device 208 and/or TNC system 204. The log may be sent to and stored in a database for retrieval by TNC system 204. As a result, when TNC system 204 receives the request, TNC system 204 may send the log for the driver to supplemental endorsement system 202. Additionally or alternatively, TNC system 204 or mobile device 208 may use the log to determine which period (e.g., app off, app on, in route for pickup, or transporting a passenger) and send an indication of which period the driver was in at the time of the accident to supplemental endorsement system 202. If the received response is the log/metadata of the driver, supplemental endorsement system 202 may then use the log/metadata and the time of the accident to determine which period the driver was in at the time of the accident. If the determined period or the received indication of the period is one of periods 1-3, the process may continue to step 906. Otherwise, if the determined period or received indication of the period is period 0, the process may continue to step 910.

At step 906, supplemental endorsement system 202 may determine whether the driver's personal insurance policy was maintained and/or otherwise still active at the time of the accident by checking the database of current personal insurance policies. If not, the process may continue to step 910. If so, the process may continue to step 908.

At step 908, supplemental endorsement system 202 may determine whether the driver's TNC insurance policy is valid and maintained by sending a validation request to TNC system 204. The validation request may include an identifier of the driver. In response, supplemental endorsement system 202 may receive an indication of whether the driver has a valid TNC insurance policy and whether it was active at the time of the accident. Further, the response may include the amount of liability coverage and deductibles under the TNC insurance policy. If the driver has a valid TNC insurance policy that was active at the time of the accident, the process may continue to step 912. Otherwise, the process may continue to step 910 to notify the driver that the driver is not covered under the driver's personal endorsement policy.

Alternatively, in some examples, in response to determining that the TNC policy was invalid and/or otherwise not maintained, the supplemental endorsement system 202 might not proceed to step 910. Instead, the driver's personal endorsement policy may still provide coverage even if the TNC policy is no longer applicable. In such examples, the supplemental endorsement system 202 may provide coverage to the driver that is equal to coverage provided by the driver's personal insurance policy.

At step 910, supplemental endorsement system 202 may notify the driver that the accident is not covered under the driver's personal endorsement policy. The notification may be sent to mobile device 208 for display to the driver. The notification may include the reasons that the accident is not covered (e.g., invalid TNC insurance policy, inactive personal insurance policy, etc.).

With reference to FIG. 9B, at step 912, supplemental endorsement system 202 may receive costs associated with the accident from one or more entities (e.g., insurance providers, investigators, claims adjusters, repair shops, hospitals, etc.). At step 914, supplemental endorsement system 202 may determine which period of periods 1-3 the driver was in that the time of the accident and compute the amount of coverage and deductibles for the determined time period in the same manner as discussed above in connection with FIG. 8. If the driver was in period 1, supplemental endorsement system 202 may, at step 916, calculate the payout amount for liability and physical damage coverage based on the costs of the accident, the liability coverage calculated for period 1 (discussed above) under the personal endorsement policy, the deductible for physical damage calculated for period 1 under the personal endorsement policy, and the TNC insurance policy. If the costs of the accident are less than or equal the amount covered by the TNC insurance policy, the payout amount may be 0. If the costs exceed the amount covered by the TNC insurance policy, the payout amount may be the amount covered under personal endorsement policy until the lesser of either the costs of accident are satisfied or the coverage limit of the personal endorsement policy is reached while also accounting for the TNC insurance policy and any deductible for period 1.

If the driver was in period 2 or period 3, supplemental endorsement system 202 may, at step 918, calculate the payout deductible adjustment amount based on the costs resulting from the accident, the personal endorsement policy, and the TNC insurance policy. Because the TNC insurance policy typically provides more liability coverage than the personal insurance policy, the personal endorsement policy might not provide liability coverage (e.g., bodily injury coverage, property damage coverage, and the like). The deductible adjustment amount for physical damage may be calculated in the same manner as discussed above. As an example, the deductible amount under the personal insurance policy is $500 and the deductible amount under the personal endorsement policy is $2,500, which results in a deductible adjustment amount of $2,000 ($2,500 minus $500). If the cost for physical damage associated with the accident is $1,500, the payout amount would be $1,000. If the costs for physical damage are greater than or equal to $2,500, the payout amount would be $2,000. At step 920, supplemental endorsement system 202 may payout to one or more of the driver, TNC system 204, or other appropriate entity.

Figure 10:
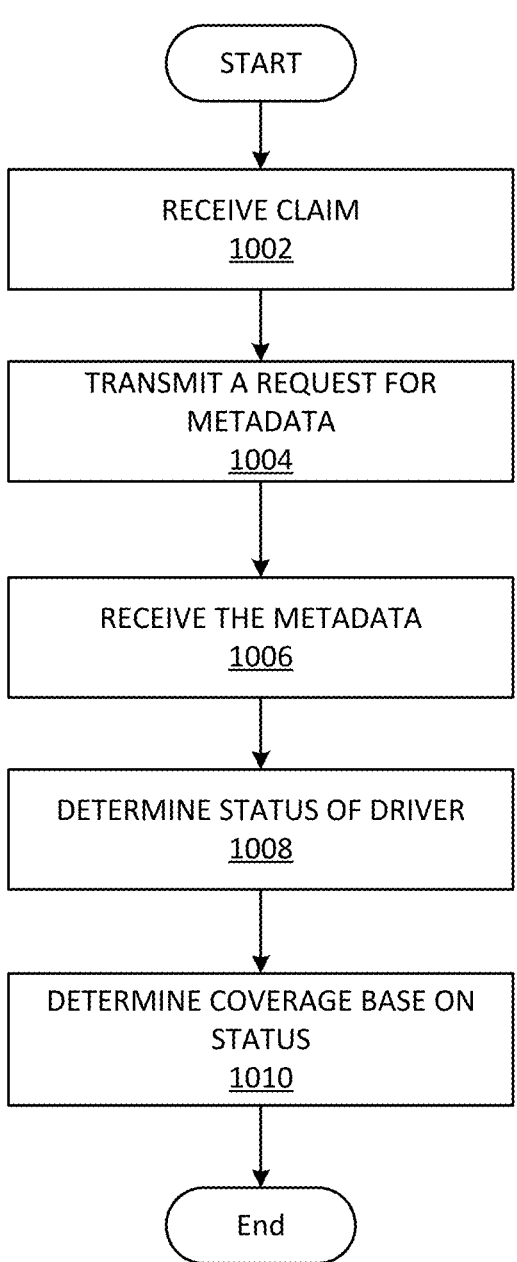
FIG. 10 depicts another illustrative method for processing a claim, according to one or more aspect of the disclosure.

FIG. 10 depicts another illustrative method for processing a claim, according to one or more aspect of the disclosure. The method of FIG. 10 and/or one or more steps thereof may be performed by a computing device of supplemental endorsement system 202. The method illustrated in FIG. 10 and/or one or more steps thereof may be partially or fully embodied, for example, in computer-executable instructions that are stored in a computer-readable medium, such as a non-transitory computer-readable memory. In some instances, one or more steps of FIG. 10 may be performed in a different order and/or combined. In some instances, one or more steps of FIG. 10 may be omitted and/or otherwise not performed.

As shown in FIG. 10, the method may begin at step 1002 in which supplemental endorsement system 202 may receive a claim after the driver's vehicle has been in a vehicular accident. The claim may have been submitted by the driver or another person or entity. A claim may be a request for supplemental endorsement system 202 to make a payout based on terms of the personal endorsement policy.

At step 1004, supplemental endorsement system 202 may transmit, to one or more of mobile device 208 or TNC system 204 (e.g., the ride hailing company), a request for metadata of the ride hailing application for the driver. TNC system 204 may look up the metadata in its database. The metadata may include events (e.g., app open/close or a selection of an icon that indicates that the customer has been picked up or dropped off, each of which may result in notifications being sent to TNC system 204, or notification to pick up a customer) and their corresponding timestamps.

At step 1006, supplemental endorsement system 202 may receive the metadata of the ride hailing application for the driver and, at step 1008, use the metadata to determine a status of the driver at the time of the accident. For instance, if the most-recent event prior to the accident was the driver closing the ride hailing application or selecting an icon of the ride hailing application indicating that the driver was not available, supplemental endorsement system 202 may determine that the driver was not available for or engaged providing ride hailing services (e.g., period 0). If the most-recent event prior to the accident was the driver turning on the ride hailing application or selecting an icon of the ride hailing application indicating that the driver was available, supplemental endorsement system 202 may determine that the driver was available for providing ride hailing services (e.g., period 1). If the most-recent event prior to the accident was the driver receiving instructions to pick up a customer, supplemental endorsement system 202 may determine that the driver was in route to pick up the customer and, thus, engaged in providing ride hailing services (e.g., period 2). If the most-recent event prior to the accident was the driver selecting an icon indicating that the customer has been picked up, supplemental endorsement system 202 may determine that the driver was transporting the customer and, thus, engaged in providing ride hailing services (e.g., period 3). If the most-recent event prior to the accident was the driver selecting an icon indicating that the customer has been dropped off, supplemental endorsement system 202 may determine that the driver is no longer transporting the customer but is available for providing ride hailing services (e.g., period 1).

At step 1010, supplemental endorsement system 202 may determine coverage based on the status of the driver. For instance, supplemental endorsement system 202 may identify the period associated with the driver's status and determine the coverage for the identified period in the same manner as discussed above.

In some instances, one or more of the systems described herein may also update or alter one or more of the devices of the system in response to the metadata received from the ride hailing application for the driver. As described, the metadata may indicate that the driver was interacting with the ride hailing application on the driver's mobile device 208 at the time of a detected accident (periods 1-3 described above). In response to the determination, the supplemental endorsement system 202 may transmit one or more instructions to components related to the supplemental endorsement system 202 to alter an operational state of the components. For example, the supplemental endorsement system 202 may transmit an instruction to the ride hailing application executed on the mobile device 208 to lock out the driver from further use of the ride hailing application. The supplemental endorsement system 202 may also instruct the mobile device 208 to transmit a communication to one or more entities, such as the police, an administrator of the ride hailing application, an owner of the vehicle 210, and the like. The supplemental endorsement system 202 may also delete or otherwise data associated with the driver. For example, the supplemental endorsement system 202 may transmit one or more instructions via the network 201 to the TNC system 204, commercial insurance system 206, and the like to alter stored data associated with the driver at the systems. The alteration to the data may indicate that an accident of the vehicle has occurred, the status of the vehicle, the period of use of the ride hailing application at the time or prior to the accident, a state associated with the driver, and the like. In general, any of the metadata received or a determination based on the metadata received from the ride hailing application may cause the supplemental endorsement system 202 to alter an operational state of one or more systems or components described herein.

In still another example, the supplemental endorsement system 202 may transmit an operational instruction to a control module of the vehicle 210, particularly in instances in which the vehicle is a semi-autonomous or fully-autonomously controlled vehicle. For example, the supplemental endorsement system 202 may transmit an instruction to disable the vehicle upon the determination of the occurrence of the accident. The vehicle may execute the received instruction and become disabled for a set period of time. In another example, the supplemental endorsement system 202 may transmit an instruction to interact with the components of the vehicle, provide an announcement through a speaker of the vehicle, or any other change in the operational state of the vehicle in response to the received metadata. In general, changes to the operational state of any component discussed herein may occur in response to the metadata received via the ride hailing application.

While throughout this description, periods 2 and 3 were treated in the same manner, supplement endorsement system

202 may treat them differently if the personal policy or TNC insurance policy has differing coverage for each of those periods.

Supplemental endorsement system 202 provides a personal endorsement policy such that the combination of the TNC insurance policy of the driver and the personal endorsement policy of the driver is greater than or equal to the driver's personal insurance policy.

In some embodiments, the personal endorsement policy may only provide coverage once the TNC insurance policy is exhausted. As an example, in response to receiving a payout request associated with an accident that occurred during period 1, supplemental endorsement system 202 may identify the liability coverage (e.g., bodily injury, property damages, etc.) corresponding to the payout request. The supplemental endorsement system may determine whether that corresponding liability coverage provided by the TNC insurance policy has been exhausted, which may be performed by sending a request for whether such corresponding liability coverage has been exhausted to the TNC system 204 and receive a response whether the corresponding liability coverage has been exhausted from the TNC system 204. If the corresponding liability coverage has not been exhausted (e.g., there is still available unused coverage), supplemental endorsement system 202 may deny the payout request, prevent payment, and send a notification to the requester of the payout that the coverage provided by the driver's TNC insurance policy must first be exhausted in order to use the corresponding liability coverage under the driver's personal endorsement policy. Otherwise, if the corresponding liability coverage has been exhausted (e.g., there is no available unused coverage), supplemental endorsement system 202 may determine whether the personal endorsement policy has been exhausted. If so, supplemental endorsement system 202 may deny the payout request, prevent payment, and send a notification to the requester of the payout that the coverage provided by the driver's personal endorsement policy has been exhausted. Otherwise, if not, supplemental endorsement system 202 may determine remaining available unused coverage provided by the personal endorsement policy for the corresponding liability coverage and payout funds as appropriate.

While the aspects described herein have been discussed with respect to specific examples including various modes of carrying out aspects of the disclosure, those skilled in the art will appreciate that there are numerous variations and permutations of the above described systems and techniques that fall within the spirit and scope of the invention.

The invention claimed is:

1. An apparatus comprising:

a processor; and a memory storing computer-readable instructions that, when executed by the processor, cause the apparatus to:

generate a ride hailing application;

transmit the ride hailing application to a mobile device of a driver of a vehicle for execution on the mobile device;

receive, from a telematics device located within the vehicle and one or more sensors of the mobile device and via a wireless connection to the processor, telematics data indicating an accident of the vehicle associated with the mobile device and comprising at least a time associated with the accident and a location of the accident obtained from a location receiver of the mobile device;

automatically generate and send, in response to determining an occurrence of the accident from the telematics data, a metadata request to the ride hailing application executed by the mobile device of the driver, the metadata request comprising a request for metadata of the ride hailing application installed on the mobile device of the driver, the metadata comprising an indication of interaction with the ride hailing application by the driver during the time of the accident as indicated by the telematics data;

receive, in response to the metadata request and from the mobile device, the metadata of the ride hailing application for the driver, wherein the metadata comprises one or more events associated with the driver and the ride hailing application, and one or more corresponding timestamps for the one or more events each indicating that the driver was interacting with the ride hailing application, installed on the mobile device of the driver, at the time of the accident;

determine, based on the metadata received from the mobile device, a period of use of a plurality of periods of use of the ride hailing application executed on the mobile device during which the accident occurred;

generate and transmit a notification to the mobile device based on a determination that the driver was interacting with the ride hailing application, the notification comprising an identification of the period of use of the plurality of periods of use of the ride hailing application executed on the mobile device during which the accident occurred; and alter, based on the transmitted notification, an operational state of the ride hailing application executed by the mobile device.

2. The apparatus of claim 1, wherein the driver was interacting with the ride hailing application when the driver has activated the ride hailing application, the driver is in route to pick up a passenger associated with the ride hailing services, or the driver is transporting the passenger associated with the ride hailing services.

3. The apparatus of claim 1, wherein the memory stores computer-readable instructions that, when executed by the processor, cause the apparatus to:

receive, via a web browser executing on the mobile device, a request to apply for a first policy;

determine that the driver does not have a second policy; send, to the web browser executing on the mobile device, a first message for display on the mobile device, the first message comprising a selectable link to an application for a second policy;

send, to the web browser executing on the mobile device, a second message for display on the mobile device, the second message comprising criteria for maintaining the second policy;

receive a third policy of the driver associated with a ride hailing service provider; compute one or more parameters of the first policy based on the second policy of the driver and the third policy of the driver associated with the ride hailing service provider, each of the one or more parameters associated with a period of use of a plurality of periods of use of the ride hailing application executed on the mobile device;

send, to the web browser executing on the mobile device and via a wireless network, a third message for display on the web browser executing on the mobile device, the third message comprising the one or more parameters; and compute a deductible adjustment amount to provide to the driver based on a deductible of the second policy of the driver and a deductible of the third policy of the driver associated with the ride hailing service provider.

4. The apparatus of claim 3, wherein the deductible adjustment amount is computed by subtracting the deductible of the second policy from the deductible of the third policy of the driver associated with the ride hailing service provider.

5. The apparatus of claim 3, wherein the ride hailing service provider is different from an entity providing the first policy; and wherein the entity providing the first policy is an entity providing the second policy of the driver.

6. The apparatus of claim 3, wherein a combination of the one or more parameters of the first policy of the driver and one or more parameters of the third policy of the driver associated with the ride hailing service are at least equal to one or more parameters of the second policy of the driver.

7. A method comprising:

generating a ride hailing application;

transmitting the ride hailing application to a mobile device of a driver of a vehicle for execution on the mobile device;

receiving, from a telematics device located within the vehicle and one or more sensors of the mobile device and via a wireless connection, telematics data indicating an accident of the vehicle associated with the mobile device and comprising at least a time associated with the accident and a location of the accident obtained from a location receiver of the mobile device;

automatically generating and sending, in response to determining an occurrence of the accident from the telematics data, a metadata request to the ride hailing application executed by the mobile device of the driver, the metadata request comprising the request for metadata of a ride hailing application installed on the mobile device, the metadata comprising an indication of interaction with the ride hailing application by the driver during the time of the accident as indicated by the telematics data;

receiving, in response to the metadata request and by an endorsement computing device, the metadata of the ride hailing application for the driver, wherein the metadata comprises one or more events, associated with the driver and the ride hailing application, and one or more corresponding timestamps for the one or more events each indicating that the driver was interacting with the ride hailing application, installed on the mobile device of the driver, at the time associated with the accident;

determining, based on the metadata received from the mobile device, a period of use of a plurality of periods of use of the ride hailing application executed on the mobile device during which the accident occurred;

in response to determining that the accident occurred while the driver was engaged in or available for providing the ride hailing services and the period of use of the plurality of periods of use of the ride hailing application executed on the mobile device during which the accident occurred, computing one or more coverage amounts of an endorsement policy based on a personal insurance policy of the driver and an insurance policy of the driver associated with the ride hailing services;

sending, to a web browser executing on the mobile device and via a wireless network, a third message for display on the web browser executing on the mobile device, the third message comprising the one or more coverage amounts;

generate and transmit a notification to the mobile device based on a determination that the driver was interacting with the ride hailing application, the notification comprising an identification of the period of use of the plurality of periods of use of the ride hailing application executed on the mobile device during which the accident occurred; and alter, based on the transmitted notification, an operational state of the ride hailing application executed by the mobile device.

8. The method of claim 7, wherein the driver was interacting with the ride hailing application when the driver has activated the ride hailing application, the driver is in route to pick up a passenger associated with the ride hailing services, or the driver is transporting the passenger associated with the ride hailing services.

9. The method of claim 7, further comprising:

receiving, by the endorsement computing device and via the web browser executing on the mobile device, a request to apply for a first policy;

sending, to the web browser executing on the mobile device, a first message for display on the mobile device, the first message comprising a selectable link to an application for a second policy;

sending, to the web browser executing on the mobile device, a second message for display on the mobile device, the second message comprising criteria for maintaining the second policy;

determining whether coverage provided by a third policy of the driver associated with the ride hailing services has been exhausted; and in response to determining that the coverage provided by the third policy of the driver associated with the ride hailing services has not been exhausted, preventing, by the endorsement computing device, a service associated with the third policy.

10. The method of claim 9, wherein a combination of the one or more parameters of the first policy of the driver and one or more parameters of the third policy of the driver associated with the ride hailing services are at least equal to the second policy of the driver.

11. The method of claim 9, further comprising computing an adjustment parameter to provide to the driver based on a parameter of the third policy of the driver and a parameter of the third policy of the driver associated with the ride hailing services.

12. A system comprising:

an endorsement server comprising:

a processing unit comprising a processor; and a memory unit storing computer-readable instructions that, when executed by the processing unit, cause the system to:

generate a ride hailing application;

transmit the ride hailing application to a mobile device of a driver of a vehicle for execution on the mobile device receive, from a telematics device located within the vehicle and one or more sensors of the mobile device and via a wireless connection to the processor, telematics data indicating an accident of the vehicle associated with the mobile device and comprising at least a time associated with the accident and a location of the accident obtained from a location receiver of the mobile device;

automatically generate and send, in response to determining an occurrence of the accident from the telematics data, a metadata request to the ride hailing application executed by the mobile device of the driver, the metadata request comprising the request for metadata of a ride hailing application installed on the mobile device of the driver, the metadata comprising an indication of interaction with the ride hailing application by the driver during the time of the accident as indicated by the telematics data;

receive, in response to the metadata request and from the mobile device, the metadata of the ride hailing application for the driver, wherein the metadata comprises one or more events associated with the driver and the ride hailing application, and one or more corresponding timestamps for the one or more events each indicating that the driver was interacting with the ride hailing application, installed on the mobile device of the driver, at the time of the accident;

determine, based on the metadata received from the mobile device, a period of use of a plurality of periods of use of the ride hailing application executed on the mobile device during which the accident occurred;

generate and transmit a notification to the mobile device based on a determination that the driver was interacting with the ride hailing application, the notification comprising an identification of the period of use of the plurality of periods of use of the ride hailing application executed on the mobile device during which the accident occurred; and alter, based on the transmitted notification, an operational state of the ride hailing application executed by the mobile device.

13. The system of claim 12, wherein the driver was interacting with the ride hailing application when the driver has notified a transportation network company that the driver is available to transport of persons on a for-hire basis, the driver is in route to pick up a passenger on the for-hire basis, or the driver is transporting the passenger on the for-hire basis.

14. The system of claim 12, wherein the computer-readable instructions that, when executed by the processing unit, cause the system to:

receive, via a web browser executing on the mobile device, a request to apply for a first policy;

determine that the driver does not have a second policy;

send, to the web browser executing on the mobile device, a first message for display on the mobile device, the first message comprising a selectable link to an application for a second policy;

send, to the web browser executing on the mobile device, a second message for display on the mobile device, the second message comprising criteria for maintaining the second policy;

receive a third policy of the driver associated with the ride hailing service provider;

compute one or more parameters of the first policy based on a second policy of the driver and the third policy of the driver associated with a ride hailing service provider, each of the one or more parameters associated with a period of use of a plurality of periods of use of the ride hailing application executed on the mobile device;

send, to the web browser executing on the mobile device and via a wireless network, a third message for display on the web browser executing on the mobile device, the third message comprising the one or more parameters;

compute a first parameter of the first policy for a time period during which the driver is available to transport persons on a for-hire basis; and compute a second parameter of the first policy for a time period during which the driver is in route to pick up a passenger on the for-hire basis or a time period during which the driver is transporting the passenger on the for-hire basis, wherein the second parameter of the first policy is different from the first parameter of the first policy.

15. The system of claim 14, wherein the parameter provided by the first policy of the driver and a parameter provided by the third policy of the driver associated with a transportation network company at least matches a parameter provided by the second policy of the driver.

16. The system of claim 14, wherein the memory unit stores computer-readable instructions that, when executed by the processing unit, further cause the system to:

compute a deductible for the first policy of the driver based on a deductible for the third policy of the driver associated with a transportation network company and a deductible for the second policy of the driver.

17. The system of claim 14, wherein the memory unit stores computer-readable instructions that, when executed by the processing unit, further cause the system to:

compute a deductible adjustment amount for payout to the driver or a transportation network company, the deductible adjustment amount based on a deductible for the third policy of the driver associated with the transportation network company and a deductible for the second policy of the driver.

18. The system of claim 14, wherein the memory unit stores computer-readable instructions that, when executed by the processing unit, further cause the system to:

send a metadata request to one or more of the mobile device of the driver or a transportation network company, the metadata request comprising a request for metadata of a ride hailing application installed on the mobile device and provided by the transportation network company.

19. The system of claim 14, wherein an entity providing the first policy is the entity providing the second policy for the driver.

20. The system of claim 12, wherein altering the operational state of the ride hailing application executed by the mobile device comprises locking out the driver of the vehicle from accessing the ride hailing application.

* * * * *